US011570740B2

(12) United States Patent
Passler

(10) Patent No.: US 11,570,740 B2
(45) Date of Patent: Jan. 31, 2023

(54) GEO-LOCATING OF WIRELESS DEVICES USING A "PASS FILTER" FUNCTION

(71) Applicant: SR Technologies, Inc., Sunrise, FL (US)

(72) Inventor: Mark Passler, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 172 days.

(21) Appl. No.: 17/076,175

(22) Filed: Oct. 21, 2020

(65) Prior Publication Data

US 2021/0302566 A1  Sep. 30, 2021

Related U.S. Application Data

(60) Provisional application No. 63/002,390, filed on Mar. 31, 2020.

(51) Int. Cl.
*H04W 24/00* (2009.01)
*H04W 64/00* (2009.01)

(52) U.S. Cl.
CPC ................... *H04W 64/00* (2013.01)

(58) Field of Classification Search
None
See application file for complete search history.

(56) References Cited

U.S. PATENT DOCUMENTS

2002/0155845 A1*  10/2002  Martorana ............... G01S 5/14
455/456.1

\* cited by examiner

*Primary Examiner* — Suhail Khan
(74) *Attorney, Agent, or Firm* — Christopher & Weisberg, P.A.

(57) ABSTRACT

A method, wireless device and measuring station are disclosed that determine the best fit geo-location of a target station. According to one aspect, a method includes, using a "Pass Filter" for minimization of the summation of squared miss probabilities SSMP that improves the fitting process of the measured data over the method of minimization of the summation of the squared residuals (SSR) in the presence of spurious measurements. A "Pass Filter" approach is disclosed that reduces the corruption of the fitting process by outlier data and still yields the same result in the limit of clean data as the classic summation of the squared residuals (SSR) method.

20 Claims, 16 Drawing Sheets

GEO-LOCATING OF WIRELESS DEVICES USING A "PASS FILTER" FUNCTION

CROSS-REFERENCE TO RELATED APPLICATION

This application is related to and claims priority to U.S. Provisional Patent Application Ser. No. 63/002,390, filed Mar. 31, 2020, entitled "GEO-LOCATING OF WIRELESS DEVICES USING A "PASS FILTER" FUNCTION" the entirety of which is incorporated herein by reference.

TECHNICAL FIELD

The present disclosure relates to geo-location of wireless devices, and in particular to a method and system for the geo-location of wireless local area network (WLAN) devices.

BACKGROUND

Initially, it is noted that IEEE Standard 802.11-2016 is used as the base reference for disclosures used herein, the entire contents of which are incorporated herein by reference. The IEEE 802.11-2016 Standard is commonly referred to as "Wi-Fi" and is referred to as such herein.

The locations of wireless devices can be determined by various methods. These methods may be classified as active, passive and combined active and passive. In an active location scheme, a device that is determining the location or range, the measuring device, transmits certain packets, referred to as "ranging packets", to the device being located, i.e., the target device, and a common method is to measure the time of arrival (TOA) of the response packet from the target device and compare that to the time of departure (TOD) of the ranging packet that was transmitted by the measuring device so as to determine the round trip time, RTT.

In an active location scheme, the TOD may be measured for a ranging packet that is transmitted from the measuring station addressed to the target station. The TOA of the response from the target station at the measuring station is then also measured. If the turnaround time for the target station to receive the packet from the measuring station and to start to transmit the response is known, or is known to be a constant, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the ranging packet transmitted from the measuring station to the target station is a data packet, the response from the target station will normally be an acknowledgement (ACK) packet. If the ranging packet transmitted from the measuring station to the target station is a control packet, for example a request-to-send (RTS) packet, then the response from the target station will normally be a clear-to-send (CTS) packet. In these two examples, the turnaround time at the target station is defined in the IEEE 802.11 standard as the short interframe spacing (SIFS), which is a preset value. Hence, the time delay, td, or time of flight (TOF) between the measuring station and the target station, may be determined from the calculation td=(TOA−TOD−SIFS)/2 and the distance between the measuring station and the target station is then td*c, where c is the speed of light. This method of estimating the distance to a target station by measuring the TOD and TOA and accounting for the turnaround time is known.

FIG. 1 is a diagram of a typical location system 100 which includes three measuring stations 110a, 110b and 110c (referred to collectively herein as "measuring stations" or "measuring receivers" 110). The target station 120 may be a wireless device, such as, for example, an Access Point (AP) that is to be located by the three measuring stations 110. The distance of the target station 120 from measuring station 110a is D1, 130. The distance of the target station 120 from measuring station 110b is D2, 140. The distance of the target station 120 from measuring station 110c is D3, 150. The time of flight, TOF1, determined from the calculation TOF=(TOA−TOD−SIFS)/2, is measured for transmissions from measuring station 110a and this can be used to calculate the distance D1 130 using the formula D1=TOF1*c/2 where c is the speed of light. Similarly, TOF2 and TOF3 measurements result in the determination of distances D2 140 and D3 150. The methods for calculating the location of target station 120 using the distances D1 130, D2 140 and D3 150 are well known.

FIG. 2 is a diagram of a location system where a single airborne measuring station 110 is used. The airborne measuring station 110 is depicted being flown in a circular orbit 200, centered at location E 220, around a target station 120 at location F 230. The distance of the target station 120 from the measuring station 110, when the measuring station 110 is at position A 201, is D4 210. The distance of the target station 120 from the measuring station 110, when the measuring station 110 is at position B 202, is D5 211. The distance of the target station 120 from the measuring station 110, when the measuring station 110 is at position C 203, is D6 212. Unless the target station 120 is positioned at the center of the orbit 200, the distances D4 210, D5 211, and D6 212 will not be equal and thus, in the general sense, as the airborne measuring station 110 moves around the orbit 200 the RTT measurements will vary in relation to the relative positions of the airborne measuring station 110 and the target station 120.

FIG. 3 is a timing diagram that describes a ranging method of the present disclosure that may be used to determine the distance between two wireless devices, wireless device STA A 300 and wireless device STA B 305. In one embodiment, one of the wireless devices (i.e., one of STA A 300 and STA B 305) may be target station 120. In another embodiment, at least one of wireless devices (i.e., at least one of STA A 300 and STA B 305) is measuring station 110. Time axis 310 refers to the time axis for STA A 300 and time axis 320 refers to the time axis for STA B 305. At time T1 311, STA A 400 transmits a packet to STA B 305. This ranging packet 312 transmission is received at STA B 305 at time T2 313. The propagation time of the ranging packet 312 transmission is (T2−T1) 330. STA B 305 transmits a response packet 324 at time T3 323. The time 322 that has elapsed between the reception of the ranging packet 312, at time T2 313, and the transmission of the response packet 324, at time T3 323, is the turnaround time at STA B 305. Ideally the turnaround time 322 at STA B 305 will be equal in duration to SIFS. At time T4 314, STA A 300 receives the response packet 324 from STA B 305. The propagation time of the transmission of the response packet 324 is (T4−T3) 334. It should be noted that the time differences 330 (T2−T1) and 334 (T4−T3) represent the propagation time, td, of the transmissions and should be equal assuming the distance between the two stations has not changed. The total time that elapses between the transmission of ranging packet 312 and the response packet 324 at STA A 300 is $$(T2-T1)+(T3-T2)+(T4-T3)=(T4-T1)=td+\text{SIFS}+td=2*td+\text{SIFS} \quad (1)$$

$$\text{Hence, } RTT=(T4-T1) \text{ and } TOF=td=(T4-T1-\text{SIFS})/2 \quad (2)$$

Expression (2) is a simplified equation that is included to provide a basic idea of an example ranging transmission method. Note that the duration of the transmitted ranging packet and the response packet is not accounted for in equation (2). Note that in practice it is common that the timestamp of a packet is set to coincide with the end of the packet at the point where the frame check is completed.

FIG. 4 is a timing diagram that describes in further detail the example ranging transmission method. Time axis 410 is the time axis for STA A 300 and time axis 420 is the time axis for STA B 305. At time Ta 411, STA A 300 starts the transmission of ranging packet 312 which is addressed to STA B 305. After a time-delay of td, at time Tb 421, STA B 305 starts to receive ranging packet 312. At time Tc 412, STA A 300 completes the transmission of ranging packet 312 and at time Td 422, STA B 305 completes the reception of ranging packet 312. The time difference between Tc 412 and Td 422 is td 431, the propagation time for the packet to travel from STA A 300 to STA B 305. Note that the time differences (Tc−Ta) and (Td−Tb) are both the duration tp 430 of the transmitted ranging packet 312.

STA B 305 transmits the response packet 324 at time Te 423. Assuming that the response packet 324 is an ACK or an CTS packet in reply to the received ranging packet 312, time Te 423 ideally will be at a time $t_{SIFS}$ 432 after time Td 422, where $t_{SIFS}$ 432 is the SIFS time as defined in the IEEE 802.11 standard. At time Tf 413, STA A 300 starts to receive the response packet 324. The time difference between Te 423 and Tf 413 is td 433, the propagation time for the packet to travel from STA to B 305 STA A 300, and is equal to the propagation time td 431. At time Tg 424, STA B 305 completes the transmission of the response packet 324 and at time Th 414, STA A 300 completes receiving the response packet 324. RTT 430 is the time, Th, that the response packet 324 was received at STA 1 300, minus the time, Tc, that the ranging packet 312 was transmitted by STA A 300. Note that the time differences (Tb−Ta), (Td−Tc), (Tf−Te) and (Th−Tg) are all equal and have the value td 431 which is the propagation time for the ranging packet and response packet to travel between the two STAs.

At STA A 300, the time of a packet at the point when the frame check has completed, may be recorded. Hence, if STA A 300 is the measuring station, the time for the transmission of ranging packet 312 that is recorded is Tc 412, and the time that is recorded for the reception of the response packet 324 is Th 414. In order to calculate the value of td, it is necessary to know the duration tr 434 of the response packet 324. Calculating the duration tr 434 is straightforward at least because the duration of the response packet 324 is defined in the Standard. In practice therefore, STA A 300 can calculate the values of RTT 430 and td (TOF) from expression (3):

$$RTT=(Th-Tc) \text{ and } td=(RTT-tr-t_{SIFS})/2=TOF \quad (3)$$

$$\text{and hence the corresponding distance, } D=td*c \quad (4)$$

Stated another way, STA A 300 begins transmission of ranging packet 312 at a beginning transmission time Ta 411 and ends transmission of the ranging packet 312 at an ending transmission time Tc 412. STA A 300 begins receiving of the response packet 324 at a beginning reception time Tf 413 and receives the complete response packet 324 at an ending reception time Th 414, wherein RTT is measured as the time between the ending reception time Th 414 and the ending transmission time Tc 412, and TOF is RTT minus the duration of the response packet tr 434, minus $t_{SIFS}$ 432, divided by 2. In the general sense ranging packets may be sent at either regular intervals or in bursts. The time Tp 450 is the time between successive ranging packets either within a burst or continuous.

Hence, with reference again to FIG. 2, as the airborne measuring station 110 flies around the target station 120 transmitting ranging packets either continuously spaced at Tp 450 or in bursts of N transmissions, each transmission within the burst being spaced at Tp 450, airborne measuring station 110 will be measuring the RTT corresponding to its own location (latitude, longitude, altitude). Based upon a set of measured RTTs and corresponding airborne measuring station 110 locations, and with knowledge of the ground elevation of the target station 120, the airborne measuring station 110 can estimate the distance to the target station 120.

RTT measurements, in the general sense, will exhibit variations due to noise, in the case of weak signal strengths, and, in part, the timing accuracy of the clock at the target station 120 and the timing accuracy of the clock at the airborne measuring station 110. In addition, it should be known that many Wi-Fi devices do not use the correct SIFS as per the IEEE 802.11 standard. Therefore, in order to derive an estimated position for the target station 120, the determination of a best fit to the RTT measurements is required. The fitting of models to data when the equations are non-linear is a well-developed discipline and the classical method for fitting the RTT measurements to a target position is by use of minimization of the summation of the squared residuals (SSR), a known technique.

It should be known that spurious response packets may occur from devices that do not correctly obey the IEEE 802.11 standard, and it is possible to receive response packets from such a device when the ranging packets 312 were not addressed to that device. In addition, it should be known that in the case of very weak signal levels, and when correlation methods may be in use for the detection of the response packet 324, it is possible to falsely detect a response packet. In the presence of such spurious RTT measurements the use of the SSR technique to determine a best fit can produce errors in the estimated position of the target station 120.

SUMMARY

Methods, wireless devices and measuring stations for the geo-location of wireless local area network (WLAN) devices.

According to one aspect, a method for a measuring station for determining a best fit geo-location of a target station, the target station responding to ranging packets transmitted by the measuring station is provided. The method includes measuring a plurality of round-trip times, RTTs, $y_i$, each RTT being a time elapsed between a transmission of a ranging packet and a reception of a response packet. The method further includes appending location parameters, $x_i$, to each RTT, $y_i$, the location parameters being associated with the location of the measuring station at a time of receipt of the response packet. The method also includes selecting initial parameters, a, the initial parameters representing a starting location for the target station. The method also includes iteratively calculating a minimum of a sum of squared miss probabilities, SSMP, to find the best fit geo-location of the target station based at least on the plurality of RRTs, $y_i$, appended location parameters, $x_i$, and initial parameters $\alpha$, until at least one pre-defined condition has been met. The calculation of SSMP includes determining best fit parameters, $\alpha$, for calculation of a target location ellipse for the target station; calculating the target location ellipse for the target station; and determining the best fit geo-location of the target station based at least on the calculated target location ellipse.

According to this aspect, in some embodiments, the method also includes, after the appending location parameters, storing appended parameters ($y_i$, $x_i$) as records in a database; and when a preset period of time has elapsed and a number of the stored records in a dataset exceeds a predetermined number, retrieving the stored records from the database. In some embodiments, iteratively calculating SSMP further includes: determining residuals; calculating a model fit probability based at least on the determined residuals; determining a model miss fit probability based at least on the calculated model fit probability; calculating a sum of squared miss fit probabilities, SSMP, based at least on the determined model miss fit probability; performing non-linear fitting based at least on the calculated SSMP; determining new parameters $\alpha$ based at least on the non-linear fitting; and determining new residuals based at least in part on the determined new parameters, $\alpha$. In some embodiments, performing non-linear fitting and determining new parameters $\alpha$ are further based on a Levenberg-Marquardt method. In some embodiments, the at least one pre-defined condition has been met when a difference between a last sum of squared miss probabilities $SSMP_j$ and a previous sum of squared miss probabilities $SSMP_{j-1}$ is less than a predetermined amount, $(SSMP_j - SSMP_{j-1}) < \Delta$. In some embodiments, the at least one pre-defined condition has been met when an absolute difference between a last two sets of parameters is not more than $10^{-6}$. In some embodiments, the location parameters, $x_i$, associated with the location of the measuring station are provided by a GPS module. In some embodiments, the measuring station is airborne. In some embodiments, the method further includes one of determining a best fit probability based on the best fit parameters, $\alpha$, according to the following equation:

$$0 = \nabla_\alpha \left( \sum_i FP_i \right)$$

where
$\sum_i FP_i = \sum_i e^{-|y_i - f(x_i, \alpha)|/\sigma}$, and determining the equivalent lowest miss probability equation:

$$0 = \nabla_\alpha SSMP = \nabla_\alpha \sum_i [1 - e^{-|y_i - f(x_i, \alpha)|/\sigma}]^2.$$

In some embodiments, the method further includes displaying the calculated target location ellipse and the best fit geo-location of the target station.

According to another aspect, a wireless device is provided for a measuring station for determining a best fit geo-location of a target station, the target station responding to ranging packets transmitted by the measuring station. The wireless device includes a transmitter receiver configured to: transmit a ranging packet; receive a response packet in response to the transmitted ranging packet; and measure a plurality of RTTs, $y_i$, each RTT being a time elapsed between a transmission of a ranging packet and a reception of a response packet. The wireless device also includes processing circuitry in communication with the transmitter receiver. The processing circuitry is configured to: append location parameters, $x_i$, to each RTT, $y_i$, the location parameters being associated with the location of the measuring station at a time of receipt of the response packet; select initial parameters, $\alpha$, the initial parameters representing a starting location for the target station; iteratively calculate a minimum of a sum of squared miss probabilities, SSMP, to find the best fit geo-location of the target station based at least on the plurality of RRTs, $y_i$, appended location parameters, $x_i$, and initial parameters a, until at least one pre-defined condition has been met, the calculation of SSMP causing the processing circuitry to: determine best fit parameters, $\alpha$, for calculation of a target location ellipse for the target station; calculate the target location ellipse for the target station; and determine the best fit geo-location of the target station based at least on the calculated target location ellipse.

According to this aspect, in some embodiments, the processing circuitry is further configured to: after appending location parameters: store appended parameters ($y_i$, $x_i$) as records in a database; and when a preset period of time has elapsed and a number of the stored records in a dataset exceeds a predetermined number, retrieve the stored records from the database. In some embodiments, the calculation of SSMP further causes the processing circuitry to: determine residuals; calculate a model fit probability based at least on the determined residuals; determine a model miss fit probability based at least on the calculated model fit probability; calculate a sum of squared miss fit probabilities, SSMP, based at least on the determined model miss fit probability; perform non-linear fitting based at least on the calculated SSMP; determine new parameters $\alpha$ based at least on the non-linear fitting; and determine new residuals based at least in part on the determined new parameters. In some embodiments, performing non-linear fitting and determining new parameters $\alpha$ are further based on a Levenberg-Marquardt method. In some embodiments, the at least one pre-defined condition has been met when a difference between a last sum of squared miss probabilities $SSMP_j$ and a previous sum of squared miss probabilities $SSMP_{j-1}$ is less than a predetermined amount, $(SSMP_j - SSMP_{j-1}) < \Delta$. In some embodiments, the at least one pre-defined condition has been met when an absolute difference between a last two sets of parameters is not more than $10^{-6}$. In some embodiments, the location parameters, $x_i$, associated with the location of the measuring station are provided by a GPS module. In some embodiments, the measuring station is airborne. In some embodiments, the processing circuitry is further configured to determine one of a best fit probability based on the best fit parameters, $\alpha$, according to the following equation:

$$0 = \nabla_\alpha \left( \sum_i FP_i \right)$$

where
$\sum_i FP_i = \sum_i e^{-|y_i - f(x_i, \alpha)|/\sigma}$, and the equivalent lowest miss probability according to the following equation:

$$0 = \nabla_\alpha SSMP = \nabla_\alpha \sum_i [1 - e^{-|y_i - f(x_i, \alpha)|/\sigma}]^2.$$

According to yet another aspect, a measuring station is provided for determining a best fit geo-location of a target station, the target station responding to ranging packets transmitted by the measuring station. The measuring station includes: a global positioning system (GPS) module configured to: provide location parameters associated with a location of the measuring station. The measuring station further includes a wireless device in communication with the GPS module, the wireless device comprising: a transmitter receiver configured to: transmit a ranging packet; receive a response packet in response to the transmitted ranging packet; and measure a plurality of RTTs, $y_i$, each RTT being a time elapsed between a transmission of a ranging packet and a reception of a response packet. The measuring station also includes processing circuitry in communication with the transmitter receiver. The processing circuitry is configured to: append the location parameters, $x_i$, to each RTT, $y_i$, the location parameters being associated with the location of the measuring station at a time of receipt of the response packet; store appended parameters ($y_i$, $x_i$) as records in a database. The processing circuitry is also configured to, when a preset period of time has elapsed and a number of the stored records in a dataset exceeds a predetermined number, retrieve the stored records from the database: select initial parameters, α, the initial parameters representing a starting location for the target station; iteratively calculate a minimum of a sum of squared miss probabilities, SSMP, to find the best fit geo-location of the target station based at least on the plurality of RRTs, $y_i$, appended location parameters, $x_i$, and initial parameters α, until at least one pre-defined condition has been met; determine residuals; calculate a model fit probability based at least on the determined residuals; determine a model miss fit probability based at least on the calculated model fit probability; calculate a sum of squared miss fit probabilities, SSMP, based at least on the determined model miss fit probability; perform non-linear fitting based at least on the calculated SSMP; determine new parameters α based at least on the non-linear fitting; determine new residuals based at least in part on the determined new parameters; and determine best fit parameters, α, for calculation of a target location ellipse for the target station; calculate the target location ellipse for the target station; and determine the best fit geo-location of the target station based at least on the calculated target location ellipse.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
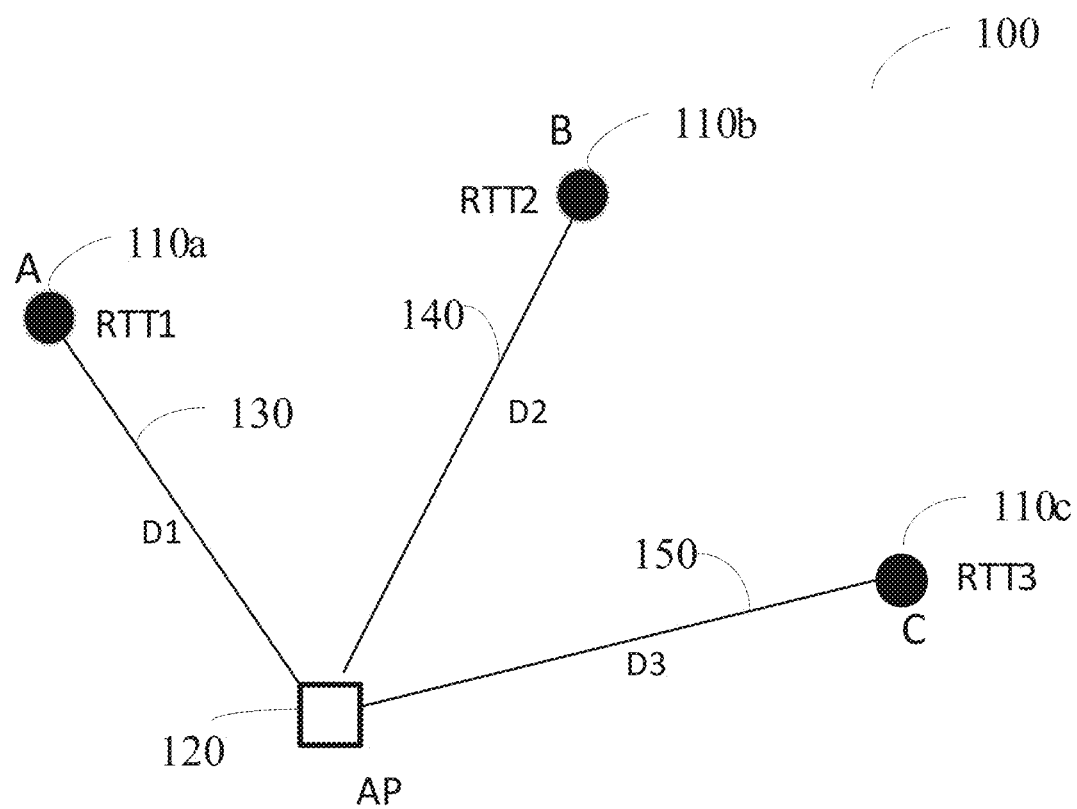
FIG. 1 is a diagram of a typical location system which includes three measuring stations.

A method and devices are disclosed that determine the geo-location of a target station, using a "Pass Filter" approach that improves the fitting process of the measured data as compared with a method using minimization of the summation of the squared residuals (SSR) in the presence of spurious measurements. A "Pass Filter" approach is disclosed that reduces the corruption of the fitting process by outlier data and still yields the same result in the presence of clean data.

As described above with reference to FIG. 2, based upon a set of measured RTTs and corresponding airborne measuring station 110 locations, and with knowledge of the ground elevation of the target station 120, the airborne measuring station 110 may estimate the position of the target station 120.

A more complete understanding of the present disclosure, and the attendant advantages and features thereof, will be more readily understood by first describing the classical method for fitting the RTT measurements to a target position by use of minimization of the summation of the squared residuals (SSR). The method for fitting the RTT measurements to a target position by use of minimization of the summation of the squared residuals (SSR) is known to one skilled in the art and hence the method is described only generally.

Assume there are N measurements with index i, of the RTT, $y_i$, from the airborne measuring station 110 to the target station 120 target. For an arbitrary target location, the RTT may be modelled by a function $f(x_i, α)$ where vectors $x_i$ are the are known locations of the airborne measuring station 110, latitude, $x_i^{LAT}$, and longitude, $x_i^{LON}$, and altitude, $x_i^{ALT}$, and where parameter vector α defines the location of the target station 120 in terms of latitude, $α^{LAT}$, and longitude, $α^{LON}$ and altitude, $α^{ALT}$, plus other parameters that may include a turnaround offset, $α^{OFF}$ to be determined. For example, $α^{OFF}$ may include the error in the SIFS of the target station 120.

The target location and offset, $α^{LAT}$, $α^{LON}$, $α^{ALT}$, and offset $α^{OFF}$, may be determined by first defining a square residual, $SR_i$. $SR_i$ is the square of the difference between the measurement of RTT, $y_i$, and the computation of total travel time, $f(x_i, α)$.

$$SR_i = [y_i - f(x_i, α)]^2 \qquad (5)$$

Where $[y_i - f(x_i, α)]$ is the residual, $R_i$ defined as the difference of the RTT, $y_i$, from the computed distance multiplied by the factor (2/c) and modified by offset to convert that distance to a model round trip time.

$$f(x_i, \alpha) = \alpha^{OFF} + \left(\frac{2}{c}\right) * d(x_i, \alpha). \quad (6)$$

Where $d(x_i, \alpha) =$ $$\left[(x_i^{LAT} - \alpha^{LAT})^2 + ((x^{LON} - \alpha^{LON}) * \cos(x_i^{LAT}))^2 + \left(\frac{x_i^{ALT} - \alpha^{ALT}}{CONVERSION}\right)^2\right]^{\frac{1}{2}}$$

It may be noted that the term CONVERSION converts the altitude units to the geographic distance units and that the speed of light is in the units of geographic distance divided by the units of RTT. For example, if latitude and longitude are used for location and microseconds are used for RTT, then c=0.0027027 degrees/microsecond. Longitude distances are scaled by the cosine of the latitude to account for spherical coordinates. All distances are sufficiently small to use planar approximation.

If the errors are Gaussian, then the best value for the target location parameters, $\alpha$, may be obtained by minimizing the sum of the square residuals (SSR=$\Sigma_i$ S $R_i$) which is defined by setting the gradient of the SSR to zero:

$$0 = \nabla_\alpha(\Sigma_i SR_i) = -2 \Sigma_i [y_i - f(x_i, \alpha_i)][\nabla_\alpha f(x_i, \alpha)] \quad (7)$$

A Jacobian $J_{i\alpha}$ may be defined as $J_{i\alpha} = \nabla_\alpha f(x_i, \alpha)$. The Jacobian $J_{i\alpha}$ may be utilized to define the direction to the minimum, known as the Steepest Descent method, may be utilized to define the direction and step size to the minimum, known as the Gauss-Newton method, or may be utilized to define the end stage direction and step size to the minimum, known as the Levenberg-Marquardt method.

Once this minimum is found, then the confidence ellipse can be found using the Jacobian $J_{i\alpha}$ evaluated with the parameter values determined by the fit. In the first step the Hessian $H_{\alpha'\alpha}$ may approximately be defined by $$H_{\alpha'\alpha} = \Sigma_i [J_{i\alpha'}]^T J_{i\alpha} \quad (8)$$

followed by a correlation matrix $\rho_{\alpha'\alpha}$ defined as the inverse of the Hessian $H_{\alpha'\alpha}$:

$$\rho_{\alpha'\alpha} = H_{\alpha'\alpha}^{-1} \quad (9)$$

Then a confidence ellipse, comprising length, width and orientation $\theta$, may then be defined for the resulting location, as per Table 1:

TABLE 1

Location Confidence Ellipse parameters

Tan (2 θ) = 2 * ρ$_{01}$/(ρ00 − ρ11);
Length$^2$ = ρ$_{00}$ Cos (θ) Cos (θ) + ρ$_{11}$ Sin (θ) Sin (θ) + 2 ρ$_{01}$ Cos (θ) Sin (θ)
Width$^2$ = ρ$_{11}$ Cos (θ) Cos (θ) + ρ$_{00}$ Sin (θ) Sin (θ) − 2 ρ$_{01}$ Cos (θ) Sin (θ)

As discussed above, a standard technique to determining the best fit to function, $f(x_i, \alpha)$, is by utilization of the method of minimization of sum of square residuals, SSR, also known as the least square residuals. For non-linear functions, such as $f(x_i, \alpha)$, there are various iterative methods that may be utilized including those known as Steepest Descent, Gauss-Newton, and Levenberg-Marquardt. These methods should be known to one skilled in the art.

The present disclosure is a method for finding the best fit that is equivalent to the SSR method when presented with clean data, but which also handles data aberrations which disrupt the SSR method. The SSR method for non-linear functions may not be effective if presented with datasets that include outliers that are far from the average or biased to one side of the average, or if presented with datasets that are corrupted such that they may include data from two separate but indistinguishable devices.

With respect to outliers, because $y_i$ (RTT) is always positive, if the standard deviation of the errors in RTT exceeds the actual RTT, the mean of the data will exceed the actual RTT. Similarly, for distance which is also positive.

As discussed above, it is possible to receive response packets from devices not addressed by the ranging packets resulting in a second dataset from the rogue device in addition to the dataset from the addressed target station 120. The SSR method will tend to yield results that are an average of the two datasets, resulting in an error for the displayed location of the intended target station 120.

A method is disclosed that maximizes the data count fitting to a model rather than minimize the distance between a model and the data, as is the case with the SSR method. This disclosed method is designed to accommodate the two cases discussed above for outliers and for corrupt data sets. The method defines a "fit probability" (FP) function which measures how well each data point fits the model. The FP function is defined such that data points close to the model have an FP value approaching one and data points distant from the model have an FP value approaching zero. Hence the fitting process should maximize the total fit probability. Hence, outliers, as described above, would have little influence on the model parameters because their contribution to the total fit probability would asymptotically approach zero, as opposed to minimizing the least square residuals where distant outliers have increasingly significant impact on the sum square residuals defined by the square of the distance.

Many functions satisfy the asymptotically approaching zero requirement, but a function is defined that has certain advantages to be discussed below. The FP function, $FP_i$, is defined as:

$$FP_i = e^{-|y_i - f(x_i, \alpha)|/\sigma}$$

$FP_i \to 1$ if $|y_i - f(x_i, \alpha)| << \sigma$ $FP_i \to 0$ if $|y_i - f(x_i, \alpha)| >> \sigma \quad (10)$ Where $\sigma$ is the standard deviation of $y_i$ for fixed $x_i$ The model parameters may be found by maximizing the sum of fit probability, SFP, for all the data:

$$SFP = \Sigma_i FP_i = \Sigma_i e^{-|y_i - f(x_i, \alpha)|/\sigma}$$

and then the best model fit may be found by setting the gradient of the SFP, to zero:

$$0 = \nabla_\alpha \left(\sum_i FP_i\right)$$

Such an approach would require development of procedures for maximization and determination of correlation matrix/ellipse. Instead, a modification using a function of the FP may be employed to enable use of the extensive procedures already developed for SSR.

Consider the reverse of $FP_i$, i.e. in place of defining a fit probability, define a miss or non-fit probability, $MP_i$:

$$MP_i = 1 - e^{-|y_i - f(x_i, \alpha)|/\sigma} \approx |y_i - f(x_i, \alpha)| \quad (11)$$

Where the final approximation $|y_i - f(x_i, \alpha)|$ is the result of replacing the exponential function with the first two Taylor series terms which is valid when $|y_i - f(x_i, \alpha)| << \sigma$.

Note that the approximation for $MP_i$ is the same as the residual $R_i$ which implies that a method similar to the minimization of SSR method, as described above, may be used but utilizing the minimization of sum of squared miss probabilities, SSMP, instead:

$$SSMP = \Sigma_i MP_i^2 = \Sigma_i [1 - e^{-|y_i - f(x_i, \alpha)|/\sigma}]^2 \quad (12)$$

Note that the SSMP function decreases as the model better fits the data, similar to that of the SSR method, hence, in place of maximizing the sum of fit probabilities, the equivalent approach is that of minimizing the sum of the square of miss probabilities:

$$0 = \nabla_\alpha SSMP = \nabla_\alpha \Sigma_i [1 - e^{-|y_i - f(x_i, \alpha)|/\sigma}]^2 \quad (13)$$

From Equation (13) it may be noted that distant outliers have a low impact on the sum because terms $\gg \sigma$ approach the square of one minus zero regardless of how large the distance is, unlike the sum square residuals where more distant outliers have increasing effect proportional to the distance squared.

As noted above, one of the non-linear fitting schemes for SSR is Levenberg-Marquardt. This method is a hybrid of the Steepest Descent method, when far from the minimum, and the Gauss-Newton method, as the minimum is approached. The fact that a scalar monotonic function of the fit probability is used will not affect the descent direction when far from the minimum, so it is only necessary to determine the similarity between the original SSR mathematics and the new paradigm when close to the minimum. Consider the non-linear equation resulting from setting the gradient to zero:

$$0 = \nabla_\alpha (\Sigma_i MP_i^2) = -(2/\sigma) \Sigma_i [1 - e^{-|y_i - f_i|/\sigma}][e^{-|y_i - f_i|/\sigma}][\pm \nabla_\alpha f_i] \quad (14)$$

Where $f_i = f(x_i, \alpha)$

The positive gradient case is for $y_i > f_i$, $-|y_i - f_i| \rightarrow -(y_i - f_i)$, and the negative gradient case is for $y_i < f_i$, $-|y_i - f_i| \rightarrow +(y_i - f_i)$ When close to the minimum, the first two terms of the Taylor series for the exponential function in the first term of equation (14) is a good approximation, resulting in equation (15):

$$0 = -(2/\sigma) \Sigma_i \{[\pm(y_i - f_i)/\sigma][e^{-|y_i - f_i|/\sigma}][\pm \nabla_\alpha f_i]\} \quad (15)$$

where the positive case is for $y_i > f_i$, $|y_i - f_i| \rightarrow (y_i - f_i)$, and where the negative case is for $y_i < f_i$, $|y_i - f_i| \rightarrow -(y_i - f_i)$ The ($\pm$cases) of equation (15) cancel such the (15) is the same as equation (7) modified by the factor $(1/\sigma^2) e^{-|y_i - f(x_i, \alpha)|/\sigma}$ and hence the new Jacobian is the same as the sum square residual Jacobian modified by that same factor:

$$J_{i\alpha} = \{(1/\sigma^2) e^{-|y_i - f(x_i, \alpha)|/\sigma}\} \nabla_\alpha f_i \quad (16)$$

The factor $(1/\sigma^2) e^{-|y_i - f(x_i, \alpha)|/\sigma}$ may be viewed as a "Pass Filter" weight factor for each data point. Data points where $|y_i - f((x_i, \alpha))| \ll \sigma$ are important to the fitting with the full weight of $1/\sigma^2$ and data points where $|y_i - f((x_i, \alpha))| \gg \sigma$ are irrelevant to the fitting as they have close to zero weight. This reduces any contribution for the data that is far from the model, resulting in cancellation of data that is either outlier or from a different dataset. It is possible to define in advance a reasonable standard deviation $\sigma$ and ignore any errors greater than $\sigma$ introduced by artifacts in the data collection equipment or in the data sample. This ability to disregard systematic errors as opposed to Gaussian errors will apply both as far as the fitting approach to the minimum and as far as determining the confidence ellipse about the minimum. In both cases the systematic errors are ignored because of the weighting factor.

Thus, the disclosed method of a sum of squares of non-fit probabilities satisfies the requirement of excluding outlier and alternate model data by only focusing on valid data. Only the valid data for the model contributes significantly to the fitting process and to the correlation matrix.

The standard deviation $\sigma$ may be used to define the range of the dataset $y_i$ that is considered to be fitting the model. For example, with reference to Equation (11), if a is set to be much larger than the standard deviation of $y_i$ for fixed $x_i$, then the SSMP method is the same as the SSR method as shown by the approximation in Equation (11). Conversely, if a is selected to be too small compared to the standard deviation of $y_i$ for fixed $x_i$, then only one or two points may fit the model and no minimization is possible. A value in the range of 1-3 µs may be used for a in order to suppress spurious data. A method may be used that initially sets a larger than appropriate a value to start the minimization process and then using the resulting computed a values as a starting point to continue the minimization process using a smaller value of a appropriate to the standard deviation of the data.

Figure 2:
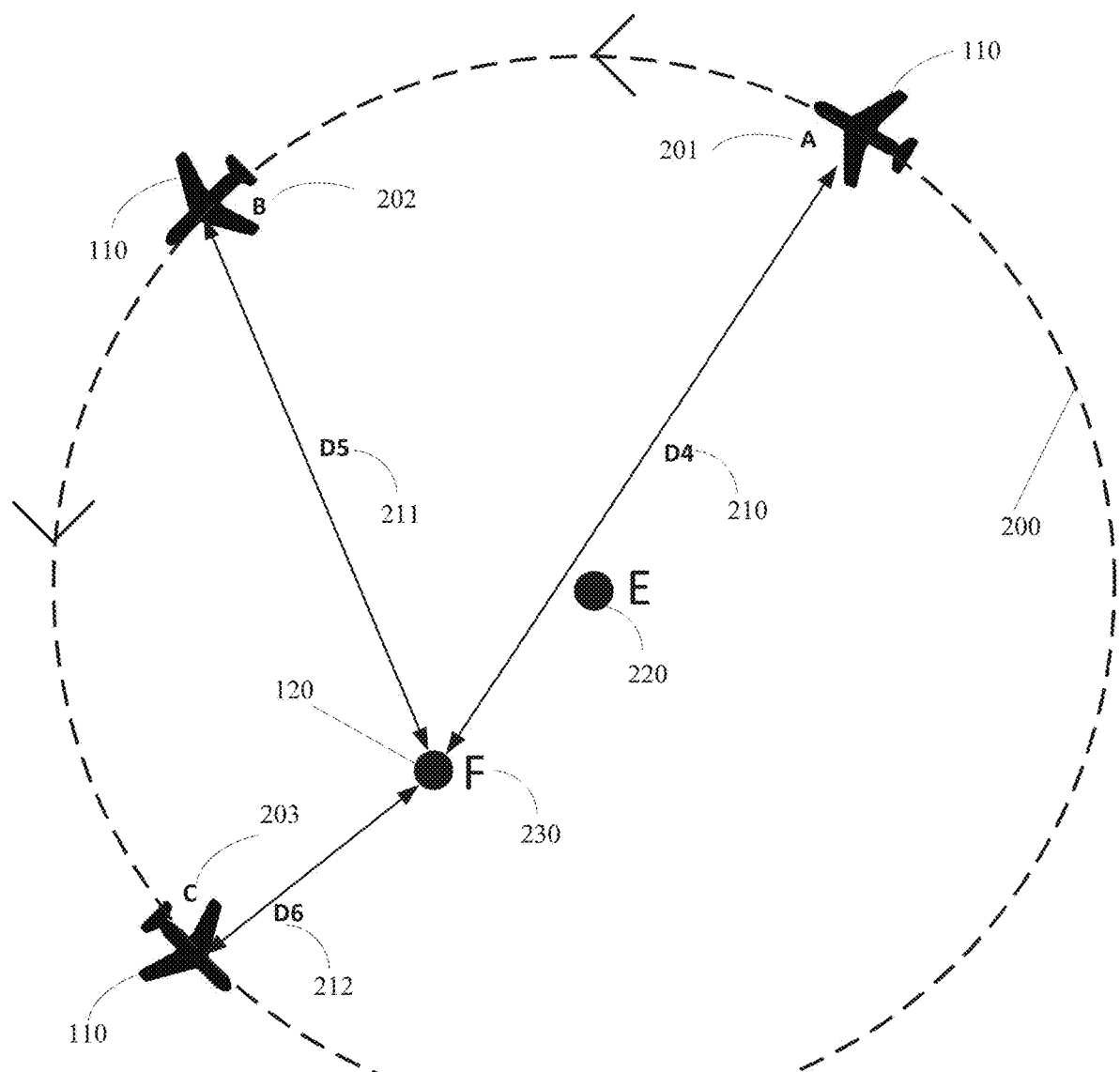
FIG. 2 is a diagram of a location system where a single airborne measuring station 110 is used.
Figure 5:
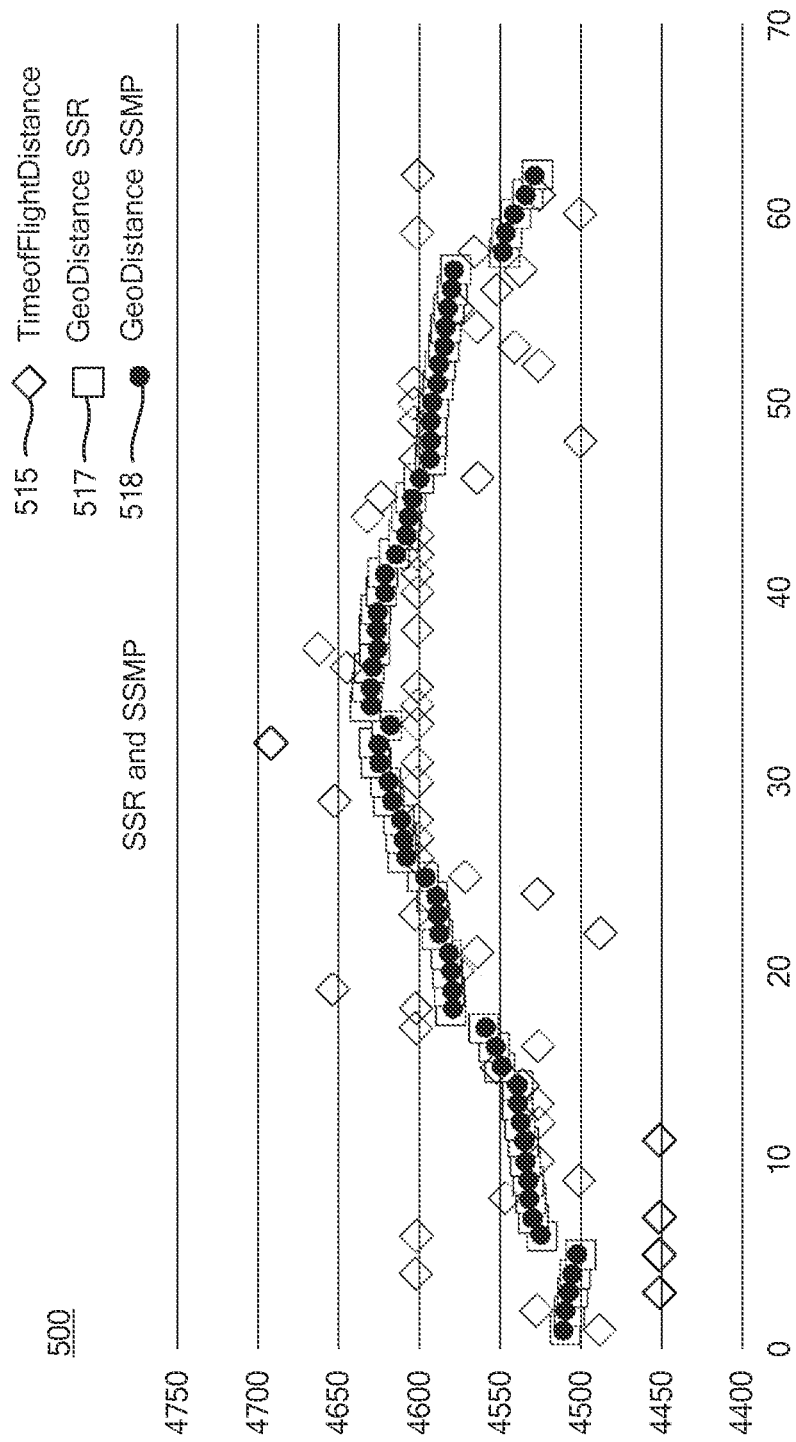
FIG. 5 is a graphical representation of fitting time of flight distances, based upon the RTTs, to the best model distances using both the classical SSR method and the disclosed SSMP method.

FIG. 5 is a graphical representation 500 of fitting time of flight distances, based upon the RTTs, to the best model distances using both the classical SSR method and the disclosed SSMP method. The x-axis represents the data count and the y-axis is in meters. With reference to FIG. 2, the results displayed in FIG. 5 are representative of a target 120 located near the location E 220 of the orbit 200. The range from the airborne measuring station 110, to the target 120 near to location E 220, is between 4500 and 4640 meters. The time of flight, TOF, readings 515 are derived from the RTT readings as per equation (3), converted to distance as per equation (4). Using these TOF readings, the results of the calculations of the best fit model for SSR, 517, and the results of the calculations of the best fit model for SSMP, 518, are shown. In this case the set of TOF readings 515 represent a typically clean set of results where there are no large outliers. As such, the results for SSR 517 and SSMP 518 are very close to each other and yield effectively the same results. Furthermore, the size and shape of the confidence ellipses are the same given the weight factors in Equation (16).

Figure 6:
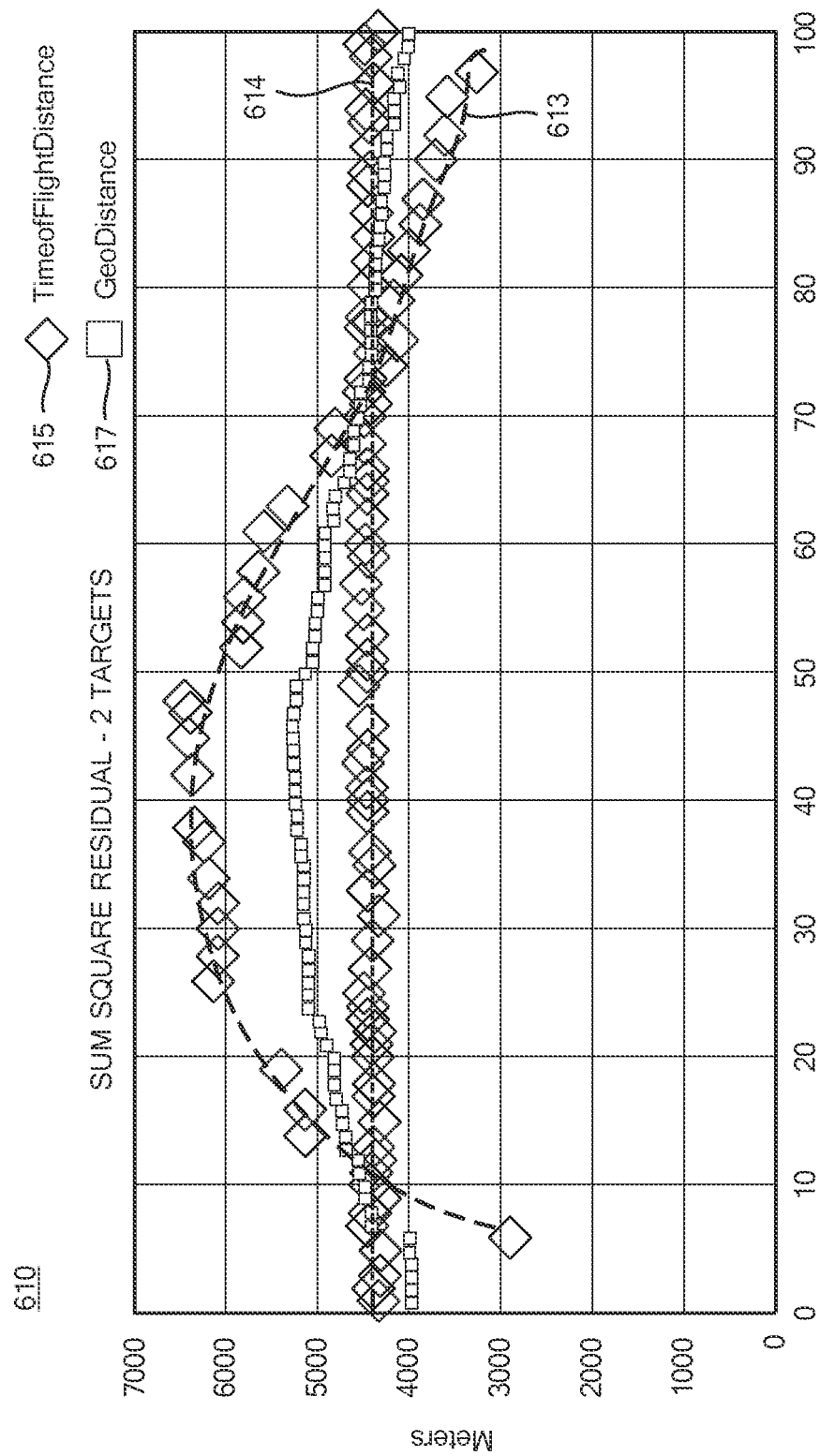
FIGS. 6, 6A and 6B depict fitting TOF distances, using the SSR method and the disclosed SSMP method, for a set of TOF readings that result when two stations are responding to the ranging packets.
Figure 6A:
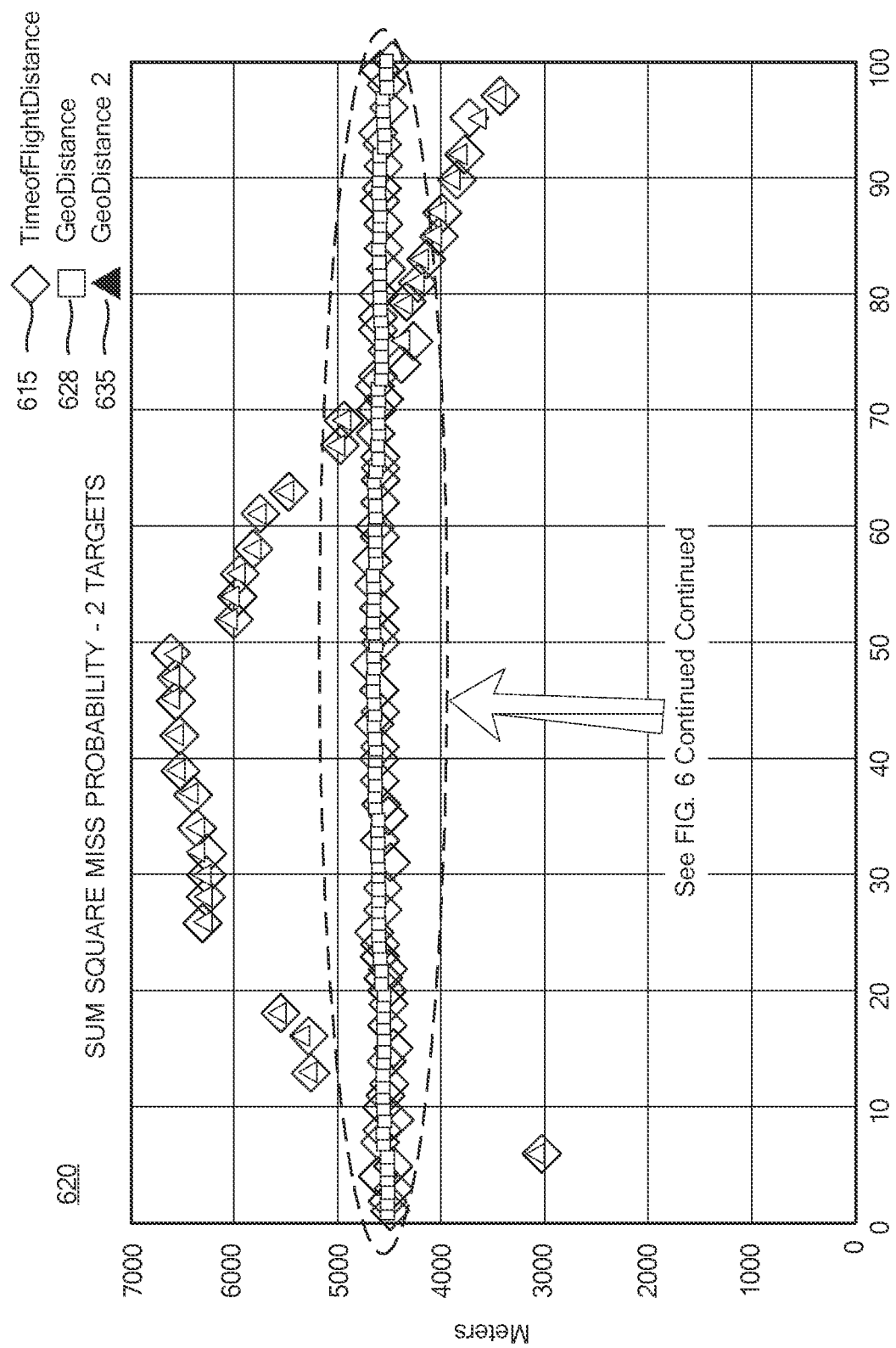
Figure 6B:
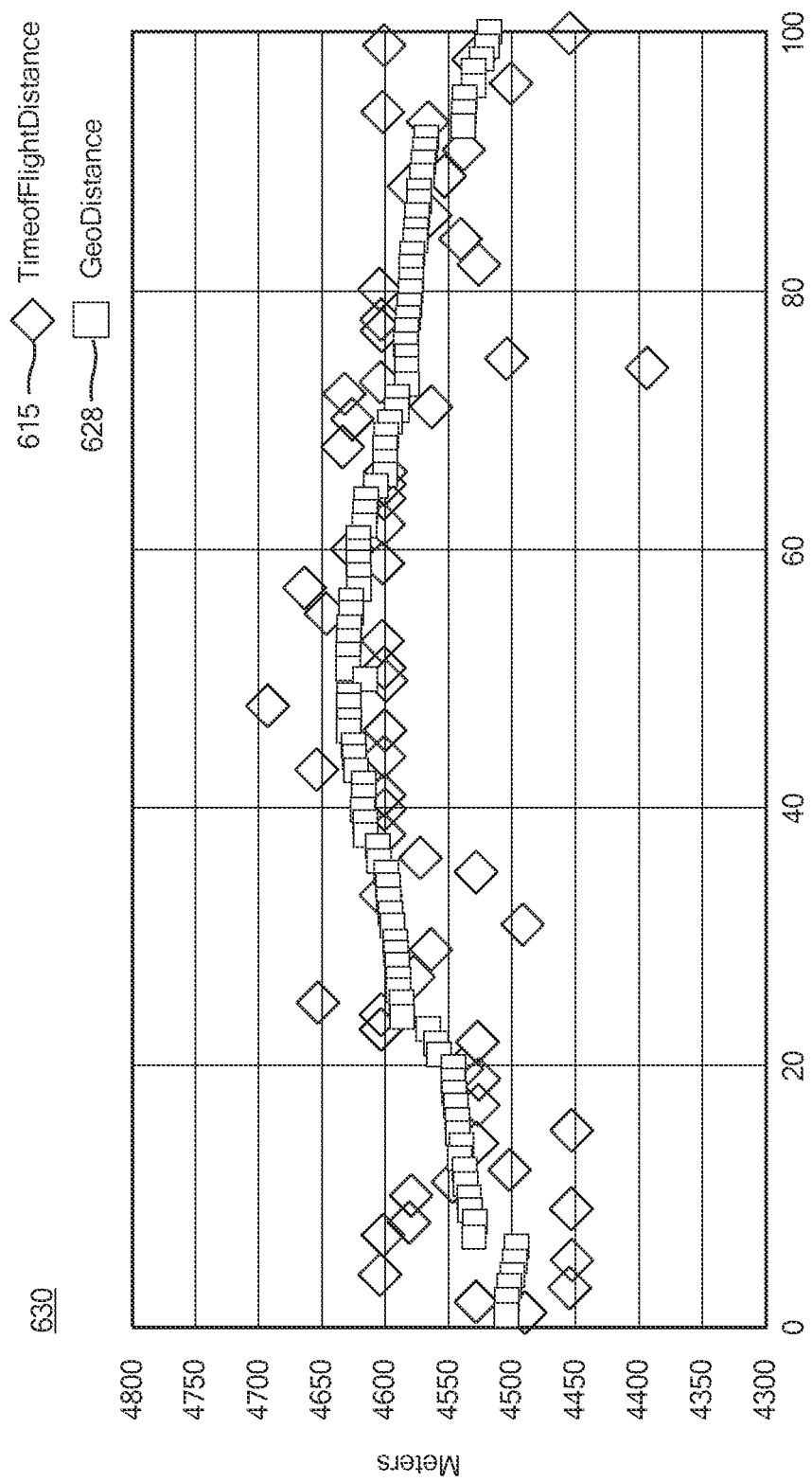

FIGS. 6, 6A and 6B depict fitting TOF distances, using the SSR method, graph 610, and the disclosed SSMP method, graphs 620 and 630, for a set of TOF readings that result when two stations are responding to the ranging packets 312. As discussed above, it is possible to receive response packets from 'rogue' devices that do not correctly obey the IEEE 802.11 standard resulting in a second dataset from that rogue device in addition to the dataset from the intended target station 120. With reference to FIG. 2, the results displayed in FIGS. 6, 6A and 6B are representative of a target 120 located near the location E 220 of the orbit 200, and the 'rogue' station is located near the location F 230 which is offset from the center of the orbit. Similar to FIG. 5, the range from the airborne measuring station 110, to the target 120 near to location E 220, is between 4500 and 4640 meters. The time of flight, TOF, readings 615 are derived from the RTT readings as per equation (3), converted to distance as per equation (4). The set of TOFs 614 are the results of the responses from the target 120 located near location E 220, and the set of TOFs 613 are the results of responses from a 'rogue' target located near position F 230. As may be observed in graph 610, the geo distances 617, calculated using the SSR method do not coincide with the set of TOFs 614 that correspond to the wanted target 120 position. As described above, the SSR method is using all the TOF readings equally and does not distinguish between them, even though there are two sets of independent TOF readings, 613 and 614.

Graph 620, in FIG. 6A has the same TOF readings 615 as graph 610 in FIG. 6. As may be observed in graph 620, the geo distances 628, calculated using the SSMP method, do coincide with the set of TOFs 614 for the wanted target station 120. Graph 630 in FIG. 6B is an expansion of graph 620 where the y-axis has been expanded to show the geo distance fit 628 in more detail. As may be observed, the geo distances 628 are very similar to those shown in FIG. 5 indicating that the SSMP method has successfully distinguished the wanted set of results from the unwanted. In graph 620, the results of the geo distances 635, for the second 'rogue' station are displayed. Once the first set of geo distances 628 have been calculated, then the corresponding set of TOFs, 614, may be removed from the dataset, leaving the set of TOFs, 613, corresponding to the 'rogue' device. The geo distances 635 for the 'rogue' device may then be calculated. FIGS. 6, 6A and demonstrate that the SSMP method is accurate in the case of two sets of TOFs. It should be noted that the determination of the real target location first, followed by the determination of the rogue target location is a result of the greater count of data from the real target relative to the rogue target. Had the reverse been the case, the first determination would have been of the rogue, followed by the real target.

Figure 7:
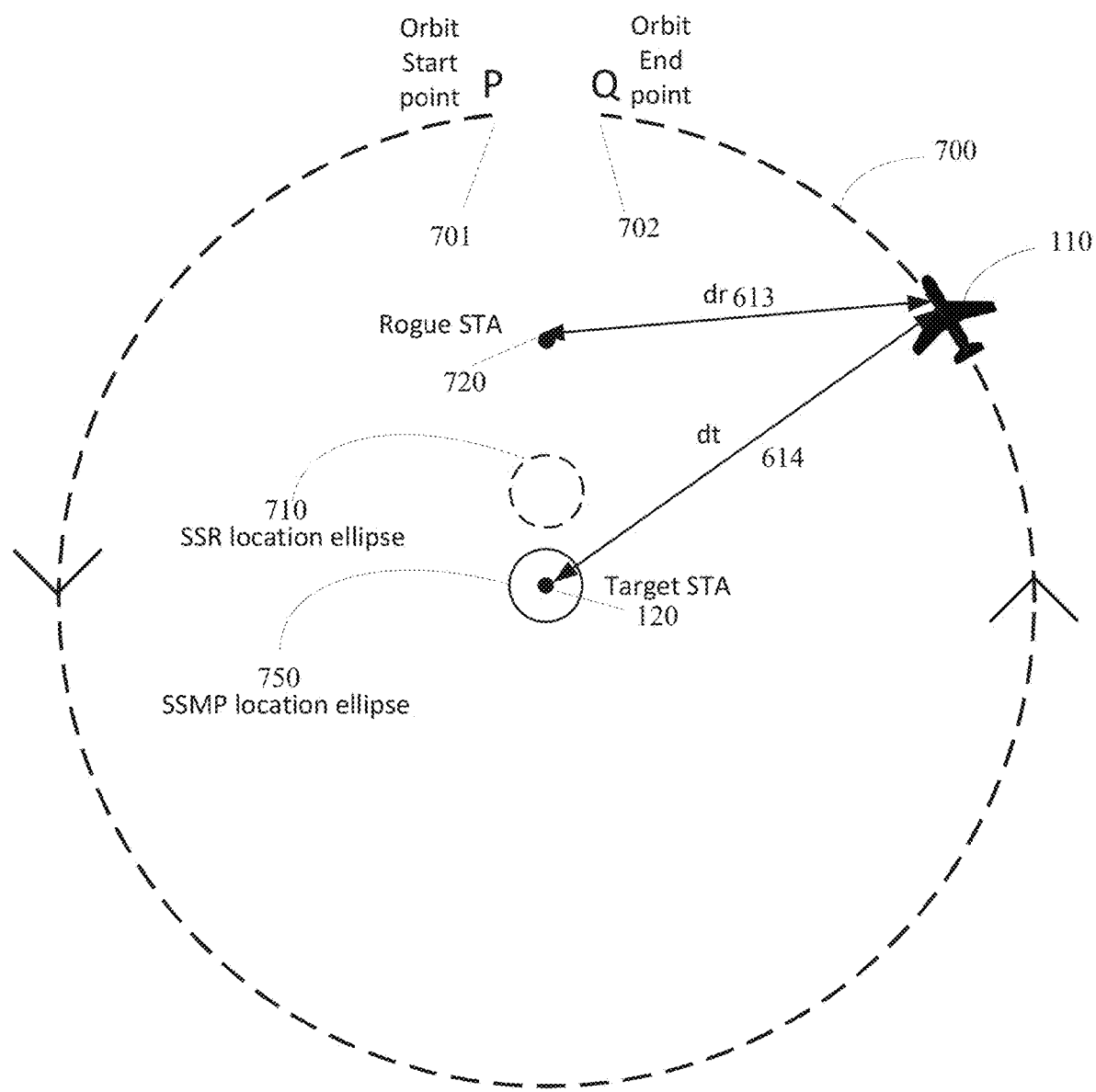
FIG. 7 is a diagram of example confidence location ellipses resulting from the conditions depicted in FIGS. 6, 6A and 6B.

FIG. 7 is a diagram of example confidence location ellipses resulting from the conditions depicted in FIGS. 6, 6A and 6B. The airborne measuring station 110 is depicted being flown in a circular orbit 700, around a target station 120 that is located near the center of the orbit 700. In this example, the orbit 700 starts at point P 701 and ends at point Q 702. A rogue station 720 is located offset from the center of the orbit closer to the start and end points, P 701 and Q 702, of the orbit 700. As the airborne measuring station 110 flies around the orbit 700, the TOF distance dt 614 to the target station 120 and the TOF distance dr 613 to the rogue station 720 vary as shown in FIGS. 6, 614 and 613 respectively. The location confidence ellipse 710 is the result of using the SSR method and does not coincide with the location of the wanted target station 120 position. The SSR method is using all the TOF readings, 615 equally and does not distinguish between them. With reference to FIG. 6, graph 610, the TOF readings 615 comprise two sets of independent TOF readings, 613 and 614, and this causes the resulting location confidence ellipse 710 to be pulled away from the target station 120 location towards the location of the rogue station 720. The location confidence ellipse 750, calculated using the SSMP method, however, does coincide with the location of the wanted target station 120 position.

Figure 8:
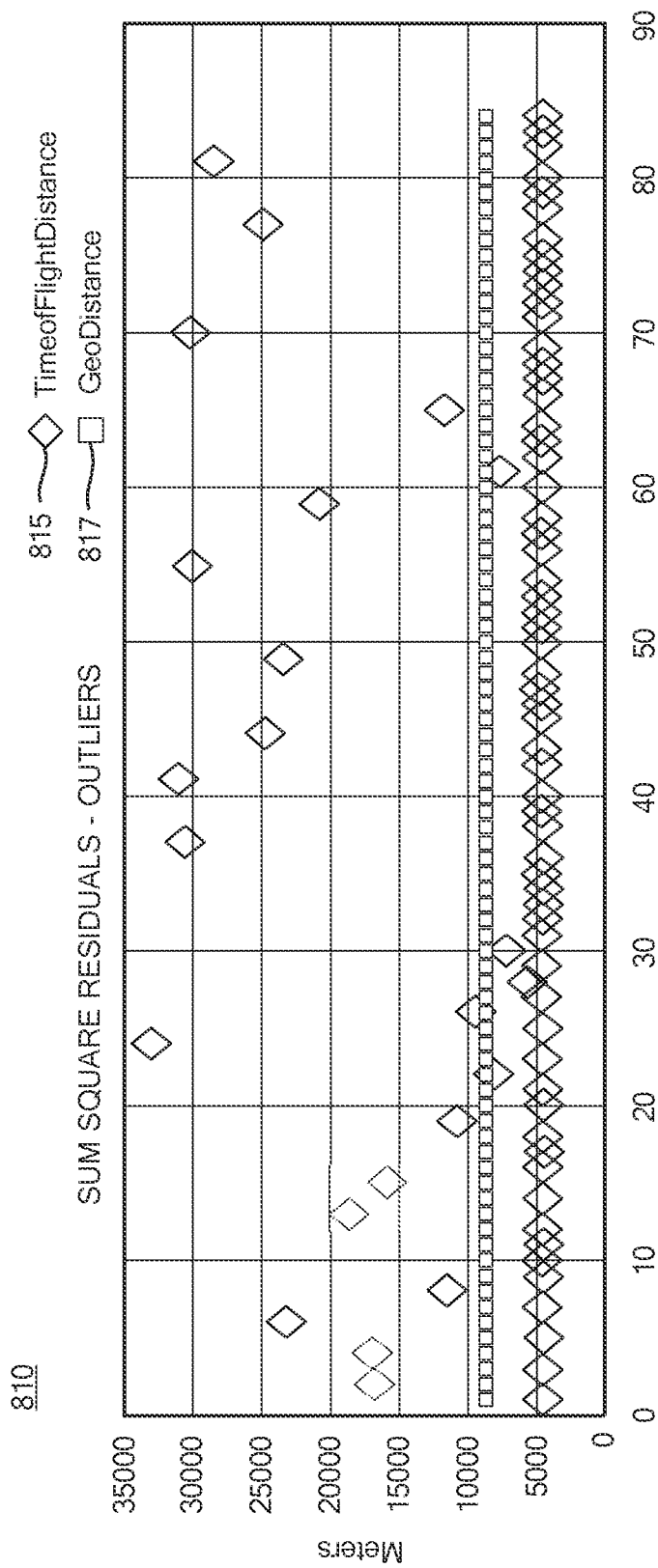
FIG. 8, 8A and 8B depict fitting TOF distances, using the SSR method and the disclosed SSMP method, for a set of TOF readings that include 'outlier' or spurious readings that are biased in one direction.
Figure 8A:
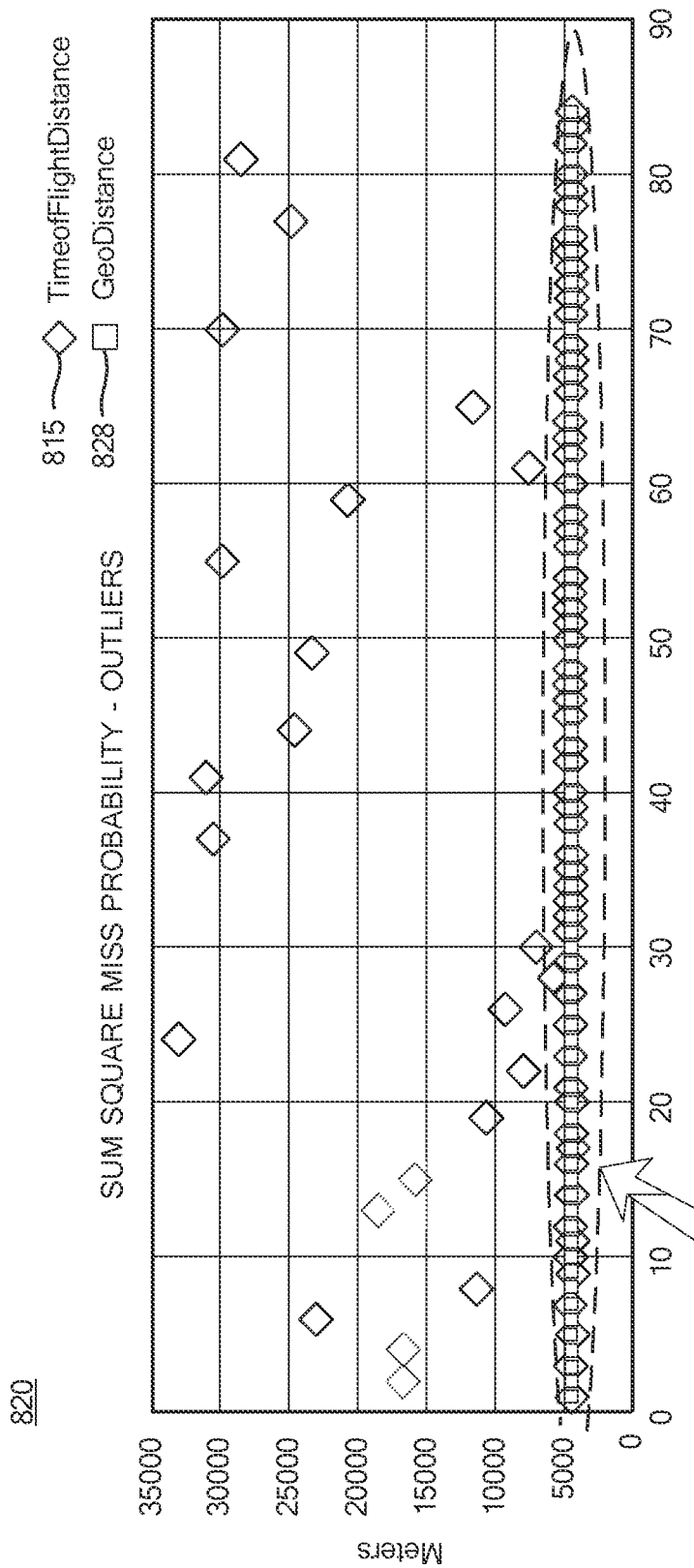
Figure 8B:
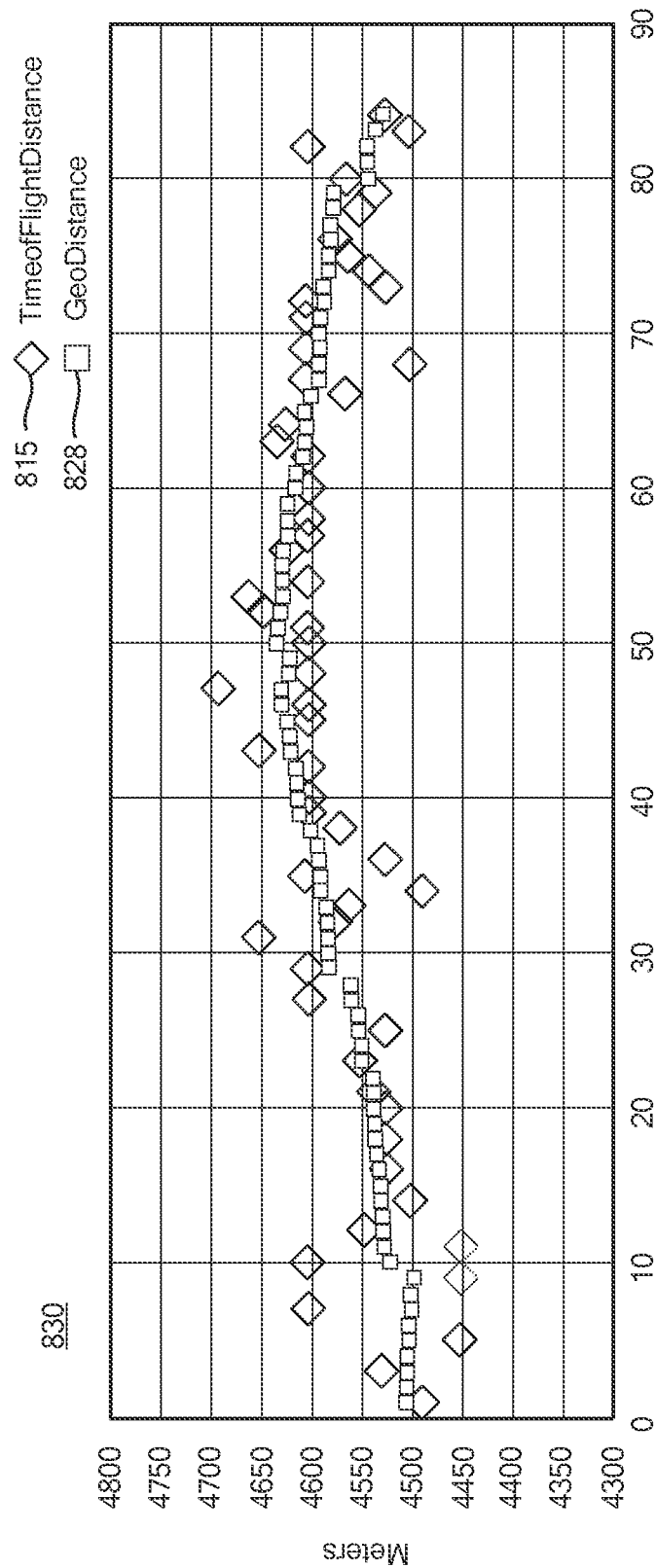

FIGS. 8, 8A and 8B depict fitting TOF distances, using the SSR method, graph 810 of FIG. 8, and the disclosed SSMP method, graphs 820 of FIG. 8A and graphs 830 of FIG. 8B, for a set of TOF readings 815 that include 'outlier' or spurious readings that are biased in one direction. As may be observed in graph 810, the geo distances 817, calculated using the SSR method, are adversely affected by the 'outlier' TOFs and the result does not correspond to the target station 120 position. As described above, the SSR method is using all the TOF readings equally and does not distinguish between them. As may be observed in graph 820, however, the geo distances 828, calculated using the SSMP method do coincide with the wanted target as is further demonstrated in graph 830 which is an expansion of graph 620 where the y-axis has been expanded to show the geo distance fit 828 in more detail. As may be observed, the geo distances 828 are very similar to those shown in FIG. 5 indicating that the SSMP method has successfully distinguished the wanted set of TOF readings from the outliers.

Hence, FIG. 5 shows that for a clean set of data, the minimization of SSMPs method performs the same as the classical minimization of SSRs method. However, in FIGS. 6, 6A and 6B, it is demonstrated that the minimization of SSMPs method can distinguish between two sets of data whereas the classical minimization of SSRs method cannot. Then in FIG. 8, 8A and 8B, it is shown that the minimization of SSMPs method can effectively eliminate offset outlier data whereas the classical minimization of SSRs method cannot.

Figure 9:
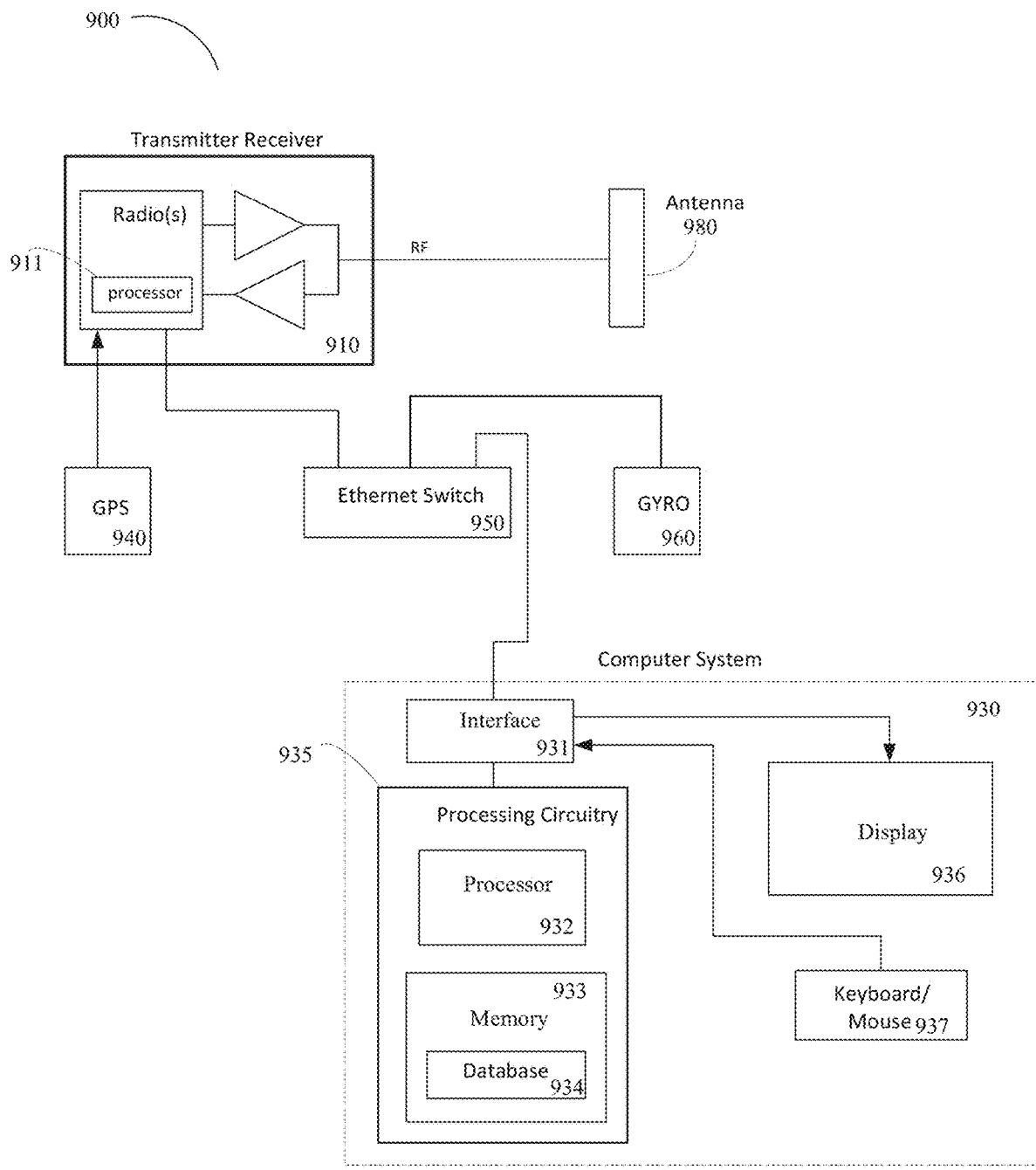
FIG. 9 is a block diagram of an example measuring system 900 that is used in accordance with the principles described herein.

FIG. 9 is a block diagram of an example measuring system 900 that is used in accordance with the principles described herein. In one embodiment measuring system 900 may be the airborne measuring station 110. In one embodiment, measuring system 900 may include an antenna assembly 980, a transmitter receiver 910, a computer system 930, a global positioning system (GPS) module 940, a gyro module 960 and a network switch 950 such as an Ethernet switch.

The transmitter receiver 910 may transmit or receive radio frequency (RF) signals to and from the antenna assembly 980. The GPS module 940 output may be connected to the transmitter receiver 910. The GPS module 940 may provide the latitude, longitude and altitude of the airborne platform. The transmitter receiver 910 may append GPS information to any RF transmission and/or reception. The network switch 950 may be connected to the Transmitter Receiver 910, and the computer system 930. The transmitter receiver 910 may include a processor 911. The GPS information may be provided to the processor 911 by the GPS module 940. RF receptions may have the GPS information added such that the position of the airborne platform is known for each received signal. The transmitter receiver 910 may include more than one radio and therefore any transmission may be automatically received by another radio within the transmitter receiver and by this means, the airborne platform position is also known for each transmission. The GPS information may be sent to the network switch 950 and therefore made available to the computer system 930.

The computer system 930 may include an interface 931. Interface 931 may contain an Ethernet connection to the network switch 950, the connection to a display 936, a connection to a keyboard and mouse 937 as well as interfacing to the processing circuitry 935. In some embodiments the processing circuitry 935 may include a processor 932, a memory 933 and a database 934. The database 934 may contain the ground mapping information of the area of interest and the processor 932 and memory 933 may be used to carry out the exemplary processes 1130 and 1140, described below, using information on the position of the airborne platform derived from the GPS module 940, the gyro module 960, and information on the target station 120 which may be inputted using the keyboard and mouse 937. The display 936 may be used to show the ground map together with the estimated location and confidence ellipse of the target station 120 which may be derived using the exemplary process 1140, described below. Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not intended to mean a physical connection nor a direct connection. It is contemplated that the signal path between one element and another may traverse multiple physical devices.

Thus, in some embodiments, the processing circuitry 935 may include the memory 933 and a processor 932, the memory 933 containing instructions which, when executed by the processor 932, configure the processor 932 to perform the one or more functions described herein. In addition to a traditional processor and memory, the processing circuitry 935 may comprise integrated circuitry for processing and/or control, e.g., one or more processors and/or processor cores and/or FPGAs (Field Programmable Gate Array) and/or ASICs (Application Specific Integrated Circuitry).

The processing circuitry 935 may include and/or be connected to and/or be configured for accessing (e.g., writing to and/or reading from) the memory 933, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 933 may be configured to store code executable by control circuitry and/or other data, e.g., data pertaining to communication, e.g., configuration and/or address data of nodes, etc. The processing circuitry 935 may be configured to control any of the methods described herein and/or to cause such methods to be performed, e.g., by the processor 932. Corresponding instructions may be stored in the memory 933, which may be readable and/or readably connected to the processing circuitry 935. In other words, the processing circuitry 935 may include a controller, which may comprise a microprocessor and/or microcontroller and/or FPGA (Field-Programmable Gate Array) device and/or ASIC (Application Specific Integrated Circuit) device. It may be considered that the processing circuitry 935 includes or may be connected or connectable to memory, which may be configured to be accessible for reading and/or writing by the controller and/or processing circuitry 935.

Figure 10:
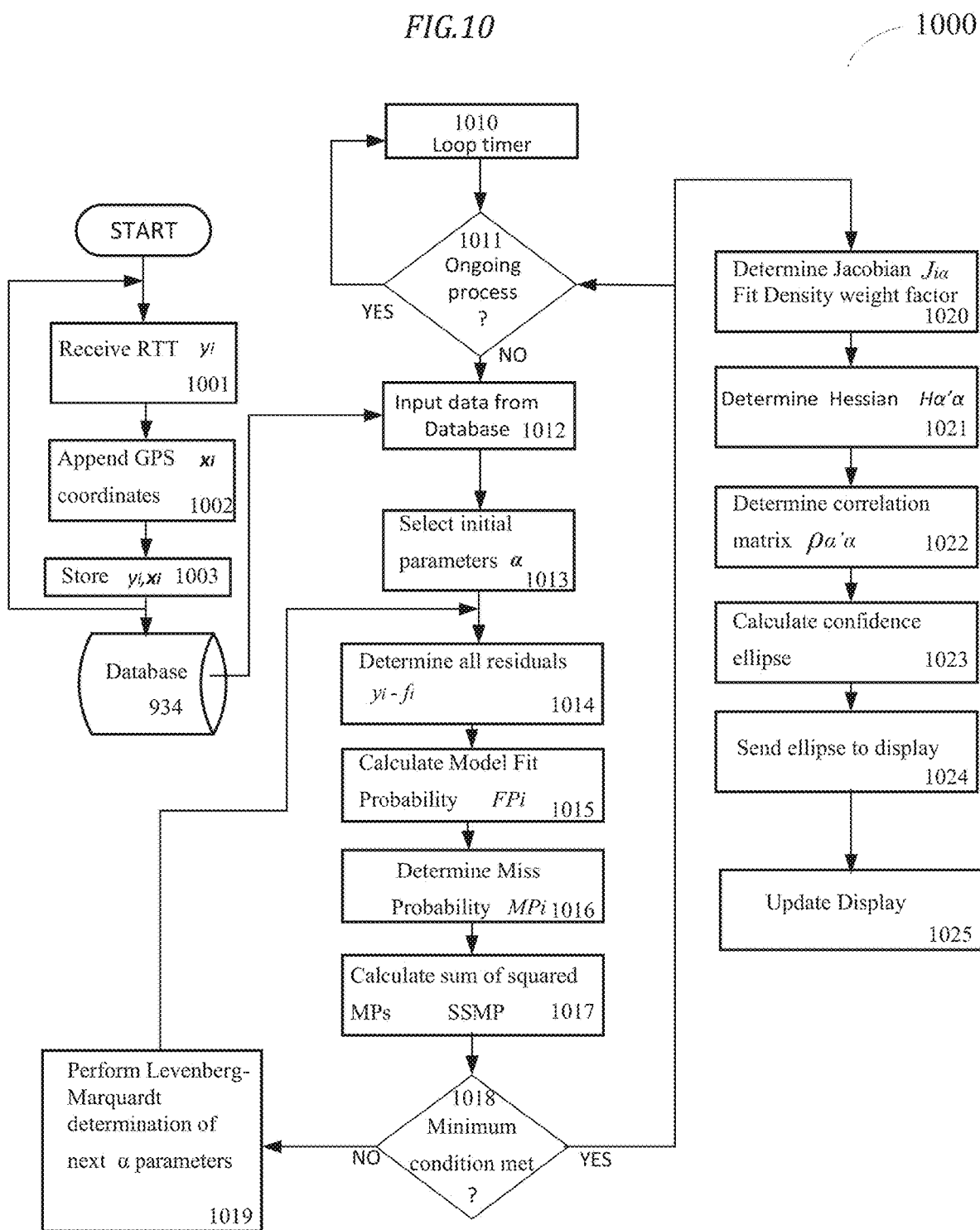
FIG. 10 is a flowchart is a non-limiting example of a method for determining the best fit model for a set of RTTs and displaying the corresponding calculated confidence ellipse of the location of the target station according to an embodiment of the disclosure.

FIG. 10 is a flowchart of a non-limiting example of a method 1000 for determining the best fit model for a set of RTTs and displaying the corresponding calculated confidence ellipse of the location of the target station 120 according to an embodiment of the disclosure.

Method 1000 may include four processes:

Process 1—receiving RTTs, appending the positional data of the airborne station and storing the datasets in a database 934 (steps 1001, 1002, and 1003);

Process 2—at preset intervals, inputting the datasets from the database and selecting initial parameters (steps 1010, 1011, 1012 and 1013), Process 3—performing the minimizing of the sum of the squared miss probabilities to find the best fit parameters (steps 1014, 1015, 1016, 1017, 1018 and 1019), and Process 4—calculating and displaying the location confidence ellipse for the target station (steps 1020, 1021, 1022, 1023, 1024, and 1025).

Figure 3:
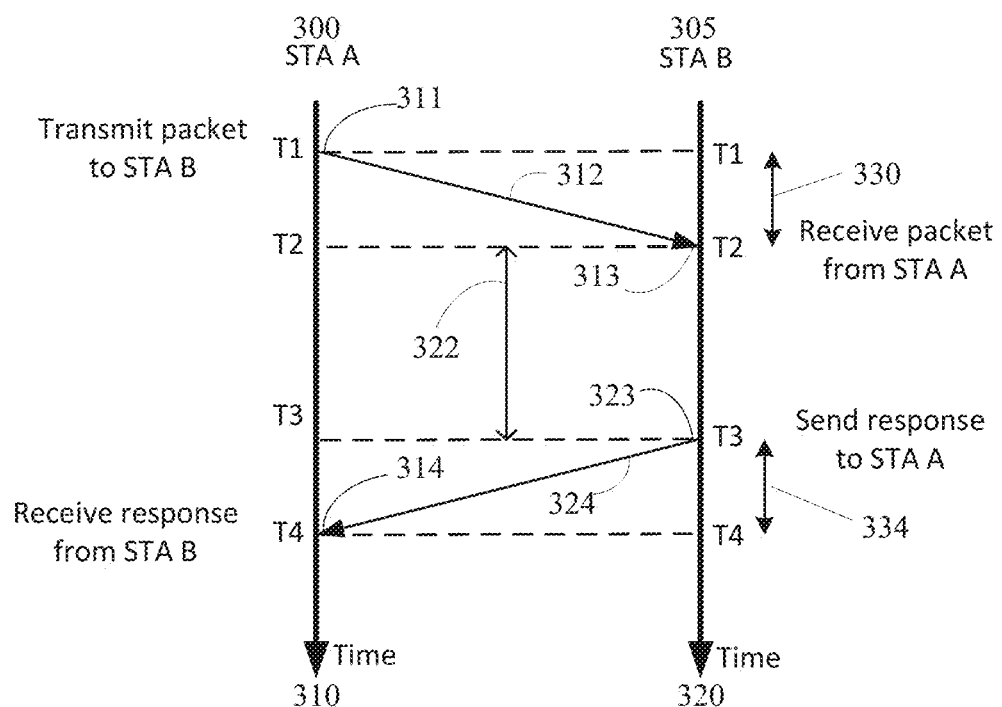
FIG. 3 is a timing diagram that describes a ranging method of the present disclosure that may be used to determine the distance between two wireless devices.
Figure 4:
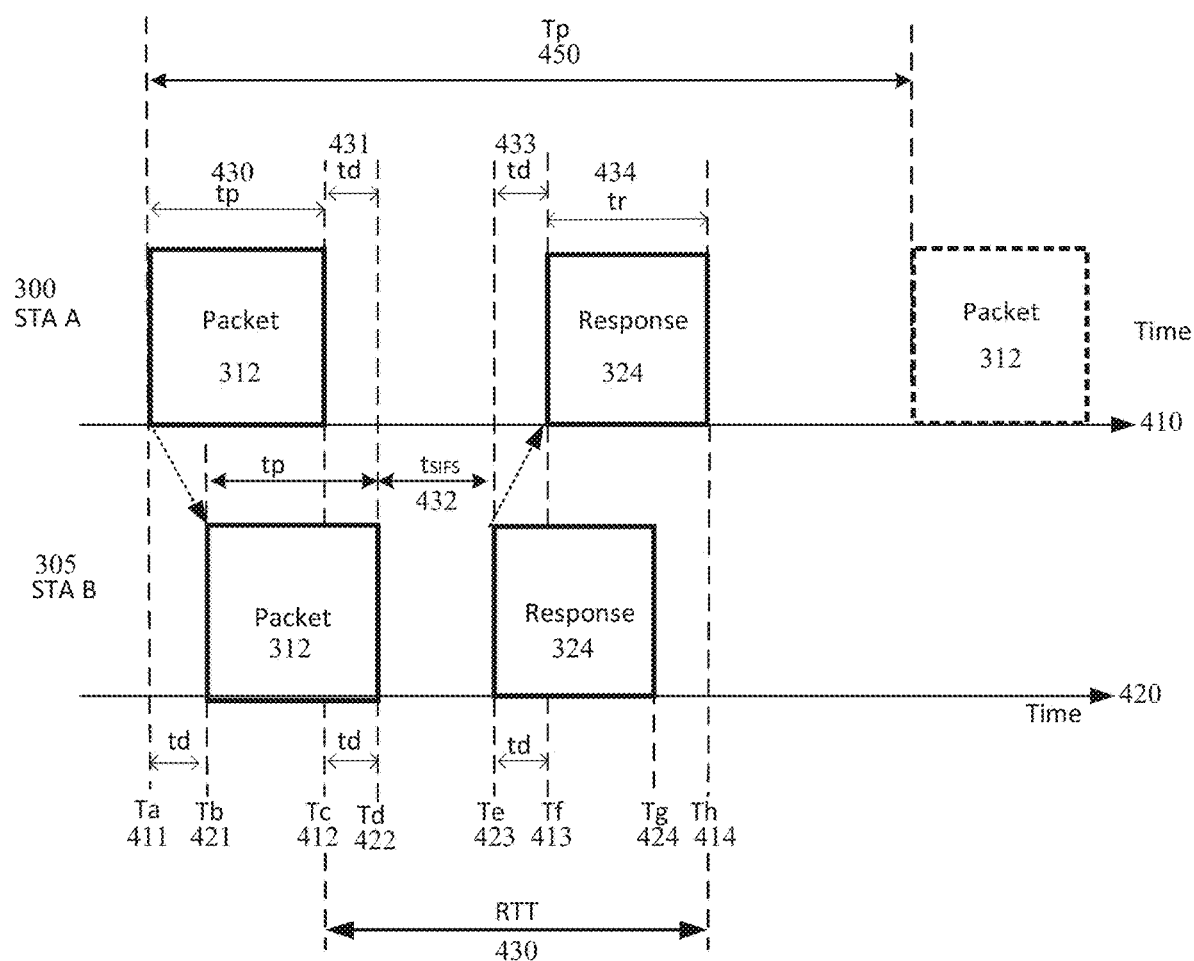
FIG. 4 is a timing diagram that describes in further detail the ranging transmission method.

The method 1000 may start at step 1001 where an RTT, $y_1$, is received. The RTT may be the result of an exchange of a ranging packet 312 transmitted by Transmitter Receiver 910 and the reception of a response packet 324, from a target station 120, received by Transmitter Receiver 910 as discussed above with reference to FIGS. 3 and 4. The location coordinates, $x_1$, of the measuring system 900 are appended to the RTT (Step 1002). The processor 911 in the Transmitter Receiver 910 may obtain the location coordinates from the GPS module 940, via the network switch 950, and then append them to the RTT data. The RTT and location data, $(y_1, x_1)$, are stored in a database 934 (Step 1003), and the process returns to step 1001 where another RTT is received. Database 934 may reside in the processing circuitry 935 in the computer system 930 and each RTT and location co-ordinates pair, $(y_i, x_i)$, from processor 911 is sent to the database 934 residing in processing circuitry 935.

A loop timer is active (step 1010). The loop timer may begin at the reception of the first RTT or when a user starts the location process via the keyboard/mouse module 937. For example, a loop time of 5 seconds may be used, and hence step 1010 may then output a signal every 5 seconds to step 1011. A check may be made at step 1011, if there is an ongoing process active. Such a process may comprise Process 3, as outlined above. The loop timer function and the active process check may be performed by the processing circuitry 935 in the computer system 930. If there is no ongoing process the dataset $(y_i, x_i)$ is taken from the database 934 (step 1012). Hence, for example, every 5 seconds the stored dataset, $(y_i, x_i)$ is inputted from the data base 934. Step 1012 may include a check that the number of sets in the dataset exceeds a predetermined number. A set of initial parameters $\alpha$ are selected (step 1013). The initial parameters $\alpha$ represent a starting location for the target station 120 in terms of latitude, $\alpha^{LAT}$, longitude, $\alpha^{LON}$, and altitude, $\alpha^{ALT}$, plus a distance measurement offset, $\alpha^{OFF}$. Any set of values may be used for an initial location. Examples may include the location of the measuring system 900, as provided by the GPS module 940, or the location E 220 at the center of the orbit 200.

The residuals $[y_i-f(x_i, \alpha)]$ may be determined at step 1014. Steps 1014 to 1019 comprise a loop where minimizing the sum of the squared miss probabilities is performed as described above with reference to equations (10), (11), (12), and (15). The loop modifies the parameters to find the best fit and continues until the minimum conditions are met in step 1018. The loop process is now described. The Fit Probability $FP_i$, as discussed above with reference to equation (10), may be calculated (step 1015). The miss or non-fit probability $MP_i$, as discussed above with reference to equation (11), may be determined (step 1016). The sum of squared miss probabilities, SSMP, as discussed above with reference to equation (12), may be calculated (step 1017). Tt may be determined, at step 1018, if the minimum conditions have been met and if not, the Levenberg-Marquardt non-linear fitting scheme may be performed, at step 1019, to determine a next set of values for the a parameters. After completion of the calculations in step 1019, the minimization process returns to step 1014. At step 1018 two minimum conditions may be checked to determine if the process has found the minimum (where j refers to the current iteration and j−1 refers to the previous iteration):

$$(SSMP_j - SSMP_{j-1}) < \Delta \quad \text{Condition a)}$$

$$ABS|\alpha_j - \alpha_{j-1}| < \Delta \quad \text{Condition b)}$$

Where Δ has a very small value. For example, a value for Δ may be in the order of $10^{-6}$. If either of these two conditions is met, in step 1018, it is determined that the minimization loop process, steps 1014 to 1019, is complete and step 1018 may indicate to step 1011 that the process is complete. The minimization loop consisting of steps 1014 to 1019 may be performed by the processing circuitry 935 in the computer system 930.

The Jacobian $J_{i\alpha}$, and the Pass Filter weight factor, as discussed above with reference to equation (16), is determined at step 1020. The Hessian $H_{\alpha'\alpha}$, as described above with reference to equation (8), may be determined, at step 1021, based upon the Jacobian determined in step 1020. The correlation matrix $\rho_{\alpha'\alpha}$, as described above with reference to equation (9), may be determined at step 1022. The location confidence ellipse parameters, as described above with reference to Table 1, may be calculated at step 1023 and the location confidence ellipse parameters are sent to a display at step 1024. Steps 1020 to 1024 may be performed by the processing circuitry 935 in the computer system 930. The display that is showing the target location may be updated at step 1025 with the new parameters from step 1023. Display 936 in the computer system 930 may be utilized as the display for the location of the target station 120.

Figure 11:
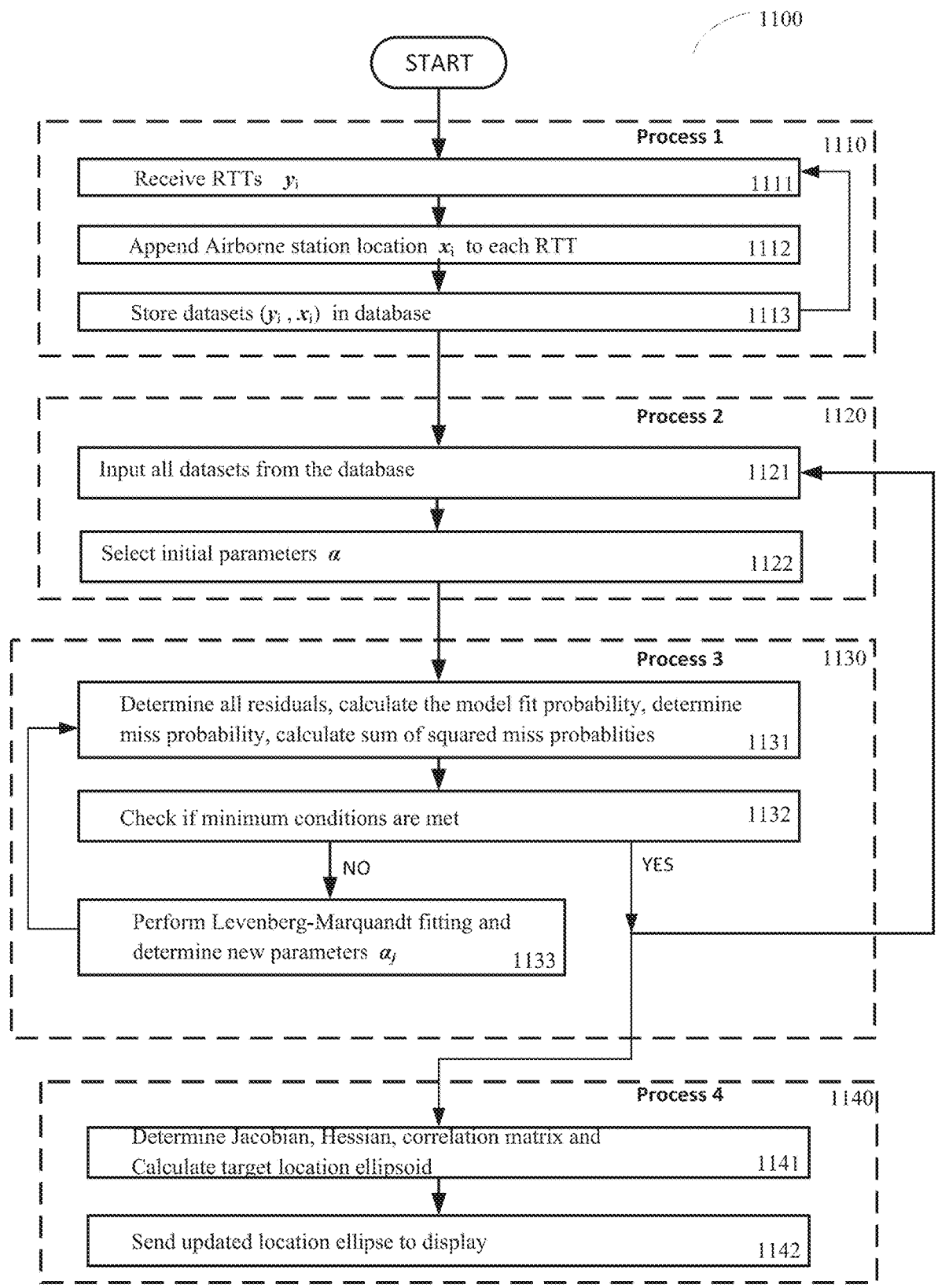
FIG. 11 is a flow diagram of a process of an example of an embodiment of the disclosure that determines the geo-location of a target station, using a "Pass Filter" approach that utilizes a method of minimization of the summation of the squared miss probabilities (SSMP)

FIG. 11 is a flow diagram of process 1100 of an example of an embodiment of the disclosure that determines the geo-location of a target station, using a "Pass Filter" approach that utilizes a method of minimization of the summation of the squared miss probabilities SSMP. Process 1100 may include four processes 1110, 1120, 1130 and 1140 that correspond to the Process 1, Process 2, Process 3, and Process 4 described above with reference to FIG. 10.

Process 1100 starts with Process 1, 1110. Process 1, 1110 includes and starts by step 1111 where RTTs, $y_i$, are received. The RTTs are the result of exchanges of ranging packets 312 transmitted by Transmitter Receiver 910 and the reception of response packets 324, from a target station 120, received by Transmitter Receiver 910, as discussed above with reference to FIGS. 3 and 4. Process 1, 1110 includes step 1112 where the GPS location co-ordinates $x_i$ of the measuring system 900 (which is also the airborne measuring station 110), are appended to the RTTs. The location coordinates, corresponding to each received RTT, are obtained from the GPS module 940 and appended to the RTTs by the processor 911 in the Transmitter Receiver 910. Process 1, 1110 includes step 1113 where the RTT and location data, $(y_i, x_i)$, is stored in a database. The database resides in the processing circuitry 935 in the computer system 930 and each RTT and location co-ordinates pair, $(y_i, x_i)$, from processor 911 is sent to the data base residing in processing circuitry 935. Process 1, 1110, continues to run until a user terminates the location operation via the keyboard/mouse 937 which provides a command to the processing circuitry 935 and the Transmitter/Receiver 910 to cease the operation. Hence, over time the dataset in the database (step 1113) becomes larger.

Process 2, 1120, includes and starts with step 1121 where the dataset in the database (step 1113) is inputted. The inputting of the dataset from the database is performed at a preset regular interval of 5 seconds. Process 2 1120 includes and step 1121 is followed by step 1122 where an initial set of parameters, $\alpha$, are selected. The initial parameters $\alpha$ represent a starting location for the target station 120 in terms of latitude, $\alpha^{LAT}$ longitude, $\alpha^{LON}$, and altitude, $\alpha^{ALT}$, plus a distance measurement offset, $\alpha^{OFF}$ The GPS parameters of the measuring system 900 (which is also the airborne measuring station 110), are used for $\alpha^{LAT}$ and altitude, $\alpha^{ALT}$, and altitude, $\alpha^{ALT}$, and a preset initial offset $\alpha^{OFF}$ of 314 μs is used, based upon a receive packet length of 304 μs plus a SIFS of 10 μs. The GPS parameters are provided by the GPS module 940. Process 2, 1120, is performed by the processing circuitry 935 within the computer system 930. The dataset and the initial parameters are then inputted to Process 3, 1130.

Process 3, 1130, includes and starts with step 1131 where a series of determinations and calculations take place on the inputted data from Process 2, 1120, step 1122. In step 1131 the residuals $[y_i-f(x_i, \alpha)]$ are first determined, then the Fit Probability $FP_i$, as discussed above with reference to equation (10), is calculated. Then the miss or non-fit probability $MP_i$, as discussed above with reference to equation (11), is determined, followed by the calculation of the sum of squared miss probabilities, SSMP, as discussed above with reference to equation (12). The determinations and calculations in Step 1131 are performed by the processing circuitry 935 in the computer system 930. Process 3, 1130, includes step 1132 where two minimum conditions are checked to determine if the process has found the minimum. The conditions checked are:

$$(SSMP_j - SSMP_{j-1}) < 10^{-6} \qquad \text{Condition a)}$$

$$ABS|\alpha_j - \alpha_{j-1}| < 10^{-6} \qquad \text{Condition b)}$$

Where j refers to the current iteration and j−1 refers to the previous iteration. Process 3, 1130 includes step 1133. If neither condition a) nor b) is met, then step 1132 is followed by step 1133 where the Levenberg-Marquardt non-linear fitting scheme is performed to determine a next values for the a parameters. These new parameters are then presented to step 1131 and the minimization process, as described for steps 1131, 1132 and 1133 continues until, at step 1132, one of the conditions a) or b) is true. If either condition, a) or b), is true then the parameters are inputted to Process 4, 1140, and a signal is sent to Process 2, 1120, step 1121 informing at step 1121 that the minimization has been completed for the last dataset that was inputted from Process 2, 1120, to Process 3, 1130. If 5 seconds has elapsed since Process 2, 1120, inputted the last dataset to Process 3, 1130, then Process 2, 1120, inputs the updated complete dataset to Process 3, 1130. If 5 seconds has not elapsed since Process 2, 1120, inputted the last dataset to Process 3, 1130, then Process 2, 1120, waits until the 5 seconds has elapsed before inputting the updated complete dataset to Process 3, 1130.

Process 4, 1140, includes and starts with step 1141 where Jacobian $J_{i\alpha}$, and the Pass Filter weight factor, as discussed above with reference to equation (16), are determined. The Hessian $H_{\alpha'\alpha}$, as described above with reference to equation (8), is then determined based upon the Jacobian and the correlation matrix $\rho_{\alpha'\alpha}$, as described above with reference to equation (9), is also determined followed by the calculation of the location confidence ellipse parameters, as described above with reference to Table 1. Process 4, 1140, includes and step 1141 is followed by step 1142 where the updated location ellipse parameters are sent to the display 936 in the computer system 930.

Process 1100 continues until the user terminates the operation via the keyboard/mouse 937.

The fitting of models to data when the equations are non-linear is a well-developed discipline used in diverse fields from physical sciences, to biology, to economics, to artificial intelligence and statistics in general. The subject of this disclosure is an approach that handles corrupt outlier data such that it does not affect the models and to identify and solve for when two sets of data are present. The discussion above describes the application of the disclosed method for the special case of geolocation. As will be appreciated by one of skill in the art, this disclosed "Pass-Filter" technique, with the use of the fit probability FP function, as described in equation (4), the miss probability MP, as defined in equation (11), and the minimization of sum of squared miss probabilities, SSMP, as defined in equations (12) and (15) overcomes the errors that arise from the use of the classical sum of squared residuals method, SSR, and hence may be used for the fitting of models to data when the equations are non-linear, across many applications.

Figure 12:
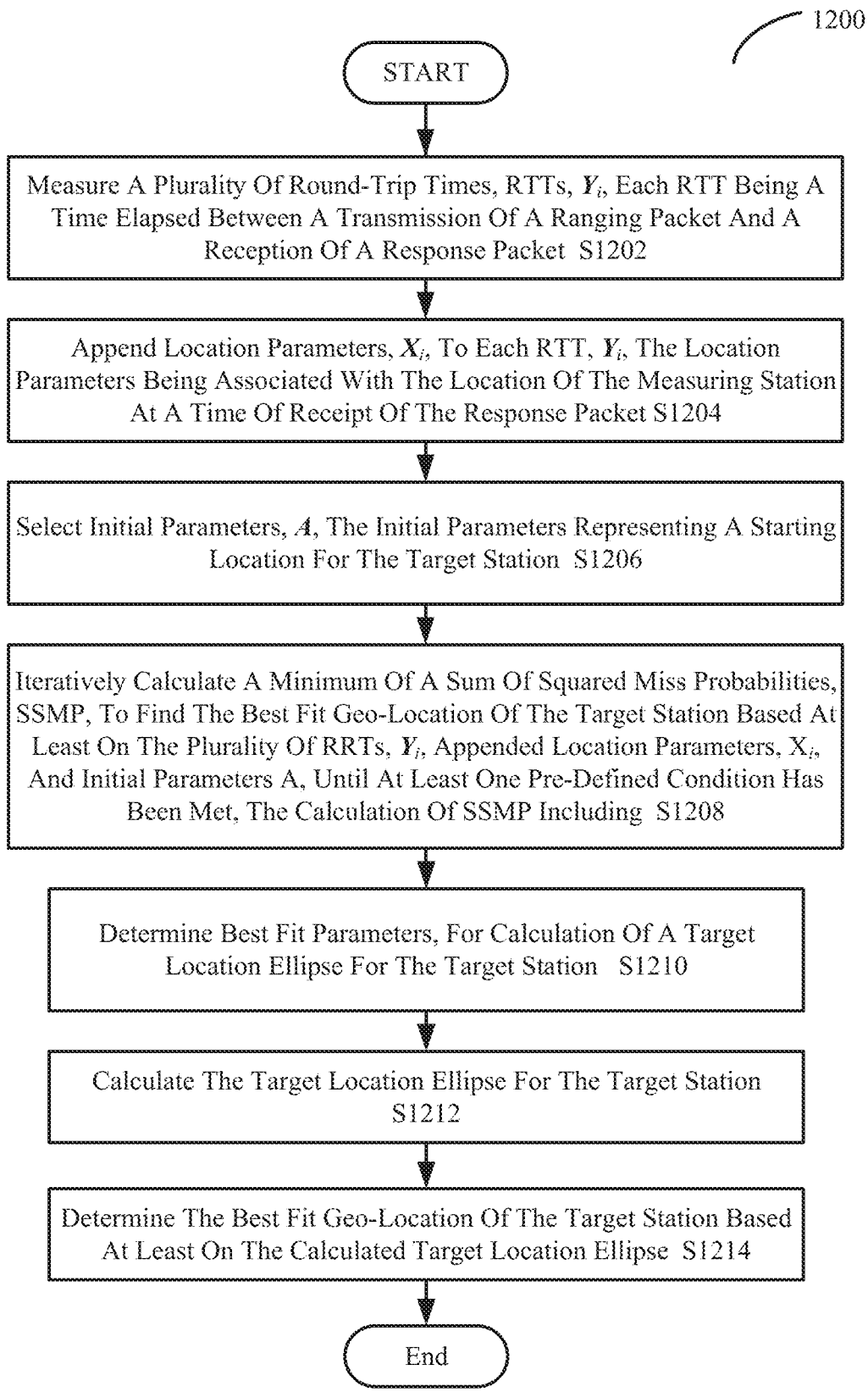
FIG. 12 is a flow diagram of an example for determining a best fit geo-location of a target station.

FIG. 12 is a flow diagram of an example process 1200 for determining a best fit geo-location of a target station. The process includes measuring, via processor 911 a plurality of RTTs, $y_i$, each RTT being a time elapsed between a transmission of a ranging packet and a reception of a response packet (Step S1202). The process also includes appending, via processing circuitry 935, location parameters, $x_i$, to each RTT, $y_i$, the location parameters being associated with the location of the measuring station at a time of receipt of the response packet (Step S1204). The process also includes selecting, via the processing circuitry 935, initial parameters, $\alpha$, the initial parameters representing a starting location for the target station (Step S1206). The process also includes iteratively calculating, via the processing circuitry 935, a minimum of a sum of squared miss probabilities, SSMP, to find the best fit geo-location of the target station based at least on the plurality of RRTs, $y_i$, appended location parameters, $x_i$, and initial parameters $\alpha$, until at least one pre-defined condition has been met (Step S1208), the calculation of SSMP including: determining best fit parameters, $\alpha$, for calculation of a target location ellipse for the target station (Step S1210); calculating the target location ellipse for the target station (Step S1212); and determining the best fit geo-location of the target station based at least on the calculated target location ellipse (Step S1214).

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the models used, the variables used, the initial parameters used, the value of $\sigma$ in the fit probability equation FP. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a measuring station for determining a best fit geo-location of a target station, the target station responding to ranging packets transmitted by the measuring station, the method comprising:

measuring a plurality of round-trip times, RTTs, $y_i$, each RTT being a time elapsed between a transmission of a ranging packet and a reception of a response packet;

appending location parameters, $x_i$, to each RTT, $y_i$, the location parameters being associated with the location of the measuring station at a time of receipt of the response packet;

selecting initial parameters, $\alpha$, the initial parameters representing a starting location for the target station;

iteratively calculating a minimum of a sum of squared miss probabilities, SSMP, to find the best fit geo-location of the target station based at least on the plurality of RRTs, $y_i$, appended location parameters, $x_i$, and initial parameters α, until at least one pre-defined condition has been met, the calculation of SSMP including:

determining best fit parameters, α, for calculation of a target location ellipse for the target station;

calculating the target location ellipse for the target station; and determining the best fit geo-location of the target station based at least on the calculated target location ellipse.

2. The method of claim 1, further including after the appending location parameters:

storing appended parameters ($y_i$, $x_i$) as records in a database; and when a preset period of time has elapsed and a number of the stored records in a dataset exceeds a predetermined number, retrieving the stored records from the database.

3. The method of claim 1, wherein iteratively calculating SSMP further includes:

determining residuals;

calculating a model fit probability based at least on the determined residuals;

determining a model miss fit probability based at least on the calculated model fit probability;

calculating a sum of squared miss fit probabilities, SSMP, based at least on the determined model miss fit probability;

performing non-linear fitting based at least on the calculated SSMP;

determining new parameters α based at least on the non-linear fitting; and determining new residuals based at least in part on the determined new parameters, α.

4. The method of claim 3, wherein performing non-linear fitting and determining new parameters α are further based on a Levenberg-Marquardt method.

5. The method of claim 1, wherein the at least one pre-defined condition has been met when a difference between a last sum of squared miss probabilities $SSMP_j$ and a previous sum of squared miss probabilities $SSMP_{j-1}$ is less than a predetermined amount, $(SSMP_j - SSMP_{j-1}) < \Delta$.

6. The method of claim 1, wherein the at least one pre-defined condition has been met when an absolute difference between a last two sets of parameters is not more than $10^{-6}$.

7. The method of claim 1, wherein the location parameters, $x_i$, associated with the location of the measuring station are provided by a GPS module.

8. The method of claim 1, wherein the measuring station is airborne.

9. The method of claim 1, further comprising one of:

determining a best fit probability based on the best fit parameters, α, according to the following equation:

$$0 = \nabla_\alpha \left( \sum_i FP_i \right)$$

where $$\sum_i FP_i = \sum_i e^{-|y_i - f(x_i,\alpha)|/\sigma};$$

and determining the equivalent lowest miss probability equation:

$$0 = \nabla_\alpha SSMP = \nabla_\alpha \Sigma_i [1 - e^{-|y_i - f(x_i,\alpha)|/\sigma}]^2.$$

10. The method of claim 1, further including displaying the calculated target location ellipse and the best fit geo-location of the target station.

11. A wireless device for a measuring station for determining a best fit geo-location of a target station, the target station responding to ranging packets transmitted by the measuring station, the wireless device comprising:

a transmitter receiver configured to:

transmit a ranging packet;

receive a response packet in response to the transmitted ranging packet; and measure a plurality of round-trip times, RTTs, $y_i$, each RTT being a time elapsed between a transmission of a ranging packet and a reception of a response packet;

processing circuitry in communication with the transmitter receiver, the processing circuitry being configured to:

append location parameters, $x_i$, to each RTT, $y_i$, the location parameters being associated with the location of the measuring station at a time of receipt of the response packet;

select initial parameters, α, the initial parameters representing a starting location for the target station;

iteratively calculate a minimum of a sum of squared miss probabilities, SSMP, to find the best fit geo-location of the target station based at least on the plurality of RRTs, $y_i$, appended location parameters, $x_i$, and initial parameters α, until at least one pre-defined condition has been met, the calculation of SSMP causing the processing circuitry to:

determine best fit parameters, a for calculation of a target location ellipse for the target station;

calculate the target location ellipse for the target station; and determine the best fit geo-location of the target station based at least on the calculated target location ellipse.

12. The wireless device of claim 11, wherein the processing circuitry is further configured to:

after appending location parameters:

store appended parameters ($y_i$, $x_i$) as records in a database; and when a preset period of time has elapsed and a number of the stored records in a dataset exceeds a predetermined number, retrieve the stored records from the database.

13. The wireless device of claim 11, the calculation of SSMP further causes the processing circuitry to:

determine residuals;

calculate a model fit probability based at least on the determined residuals;

determine a model miss fit probability based at least on the calculated model fit probability;

calculate a sum of squared miss fit probabilities, SSMP, based at least on the determined model miss fit probability;

perform non-linear fitting based at least on the calculated SSMP;

determine new parameters α based at least on the non-linear fitting; and determine new residuals based at least in part on the determined new parameters.

14. The wireless device of claim 13, wherein performing non-linear fitting and determining new parameters α are further based on a Levenberg-Marquardt method.

15. The wireless device of claim 11, wherein the at least one pre-defined condition has been met when a difference between a last sum of squared miss probabilities $SSMP_j$ and a previous sum of squared miss probabilities $SSMP_{j-1}$ is less than a predetermined amount, $(SSMP_j - SSMP_{j-1}) < \Delta$.

16. The wireless device of claim 11, wherein the at least one pre-defined condition has been met when an absolute difference between a last two sets of parameters is not more than $10^{-6}$.

17. The wireless device of claim 11, wherein the location parameters, $x_i$, associated with the location of the measuring station are provided by a GPS module.

18. The wireless device of claim 11, wherein the measuring station is airborne.

19. The wireless device of claim 11, wherein the processing circuitry is further configured to one of:
   determine a best fit probability based on the best fit parameters, α, according to the following equation:

$$0 = \nabla_\alpha \left( \sum_i FP_i \right)$$

where $$\sum_i FP_i = \sum_i e^{-|y_i - f(x_i, \alpha)|/\sigma};$$

and
   determine the equivalent lowest miss probability according to the following equation:
   $$0 = \nabla_\alpha SSMP = \nabla_\alpha \Sigma_i [1 - e^{-|y_i - f(x_i, \alpha)|/\sigma}]^2$$

20. A measuring station for determining a best fit geo-location of a target station, the target station responding to ranging packets transmitted by the measuring station, the measuring station comprising:
   a global positioning system (GPS) module configured to:
      provide location parameters associated with a location of the measuring station; and
   a wireless device in communication with the GPS module, the wireless device comprising:
      a transmitter receiver configured to:
         transmit a ranging packet;
         receive a response packet in response to the transmitted ranging packet; and
         measure a plurality of RTTs, $y_i$, each RTT being a time elapsed between a transmission of a ranging packet and a reception of a response packet; and
      processing circuitry in communication with the transmitter receiver, the processing circuitry being configured to:
         append the location parameters, $x_i$, to each RTT, $y_i$, the location parameters being associated with the location of the measuring station at a time of receipt of the response packet;
         store appended parameters ($y_i$, $x_i$) as records in a database;
         when a preset period of time has elapsed and a number of the stored records in a dataset exceeds a predetermined number, retrieve the stored records from the database;
         select initial parameters, α, the initial parameters representing a starting location for the target station;
         iteratively calculate a minimum of a sum of squared miss probabilities, SSMP, to find the best fit geo-location of the target station based at least on the plurality of RRTs, $y_i$, appended location parameters, $x_i$, and initial parameters α, until at least one pre-defined condition has been met;
         determine residuals;
         calculate a model fit probability based at least on the determined residuals;
         determine a model miss fit probability based at least on the calculated model fit probability;
         calculate a sum of squared miss fit probabilities, SSMP, based at least on the determined model miss fit probability;
         perform non-linear fitting based at least on the calculated SSMP;
         determine new parameters α based at least on the non-linear fitting;
         determine new residuals based at least in part on the determined new parameters; and
         determine best fit parameters, α, for calculation of a target location ellipse for the target station;
      calculate the target location ellipse for the target station; and
      determine the best fit geo-location of the target station based at least on the calculated target location ellipse.

* * * * *